United States Patent [19]
Nakayama

[11] Patent Number: 5,259,004
[45] Date of Patent: Nov. 2, 1993

[54] FRAME SYNCHRONIZATION DEPENDENT TYPE BIT SYNCHRONIZATION EXTRACTION CIRCUIT

[75] Inventor: Mikio Nakayama, Tokyo, Japan
[73] Assignee: Fujitsu Limited, Kawasaki, Japan
[21] Appl. No.: 666,703
[22] Filed: Mar. 8, 1991
[30] Foreign Application Priority Data
  Mar. 8, 1990 [JP] Japan .................. 2-054891
[51] Int. Cl.⁵ .............................................. H04L 7/00
[52] U.S. Cl. ..................................... 375/106; 375/120;
                                        375/118; 370/105.1
[58] Field of Search ............... 375/106, 108, 114, 116,
            375/118, 119, 120; 370/100.1, 105.1, 105.4, 106;
                                                    328/155

[56] References Cited

U.S. PATENT DOCUMENTS

| | | | |
|---|---|---|---|
| 3,671,776 | 6/1972 | Houston .............................. | 375/120 |
| 4,694,259 | 9/1987 | Carickhoff et al. ................. | 375/120 |
| 4,775,989 | 10/1988 | Takatori et al. ..................... | 375/110 |
| 4,795,985 | 1/1989 | Gailbreath, Jr. .................... | 375/119 |
| 4,933,959 | 6/1990 | Knechtel ............................. | 375/120 |

FOREIGN PATENT DOCUMENTS

0262609A3 9/1986 European Pat. Off. .
0262609A2 9/1987 European Pat. Off. .

OTHER PUBLICATIONS

M. Fukuda et al., An Echo Canceller LSI for ISDN Subscriber Loop Transmission, Jun. 7-10, 1987, pp. 596-600, Seattle, US.

Primary Examiner—Curtis Kuntz
Assistant Examiner—T. Ghebretinsae
Attorney, Agent, or Firm—Staas & Halsey

[57] ABSTRACT

A frame synchronization dependent type bit synchronization extraction circuit in an ISDN terminal equipment connected to a reference point S/T of an ISDN basic user network interface, for establishing bit synchronization between an internally produced signal and received data. To make the timing extraction jitter small and make the bit timing stable, it comprises a counter preset mode synchronization unit, a digital phase-lock loop mode synchronization unit, frame synchronization detection unit, and an inhibiting unit for inhibiting the operation of the counter preset mode synchronization unit, and the bit synchronization is effected by only the digital phase locked loop mode synchronization unit after the frame synchronization is detected by the frame synchronization detection unit.

24 Claims, 28 Drawing Sheets

Fig. 9
PRIOR ART

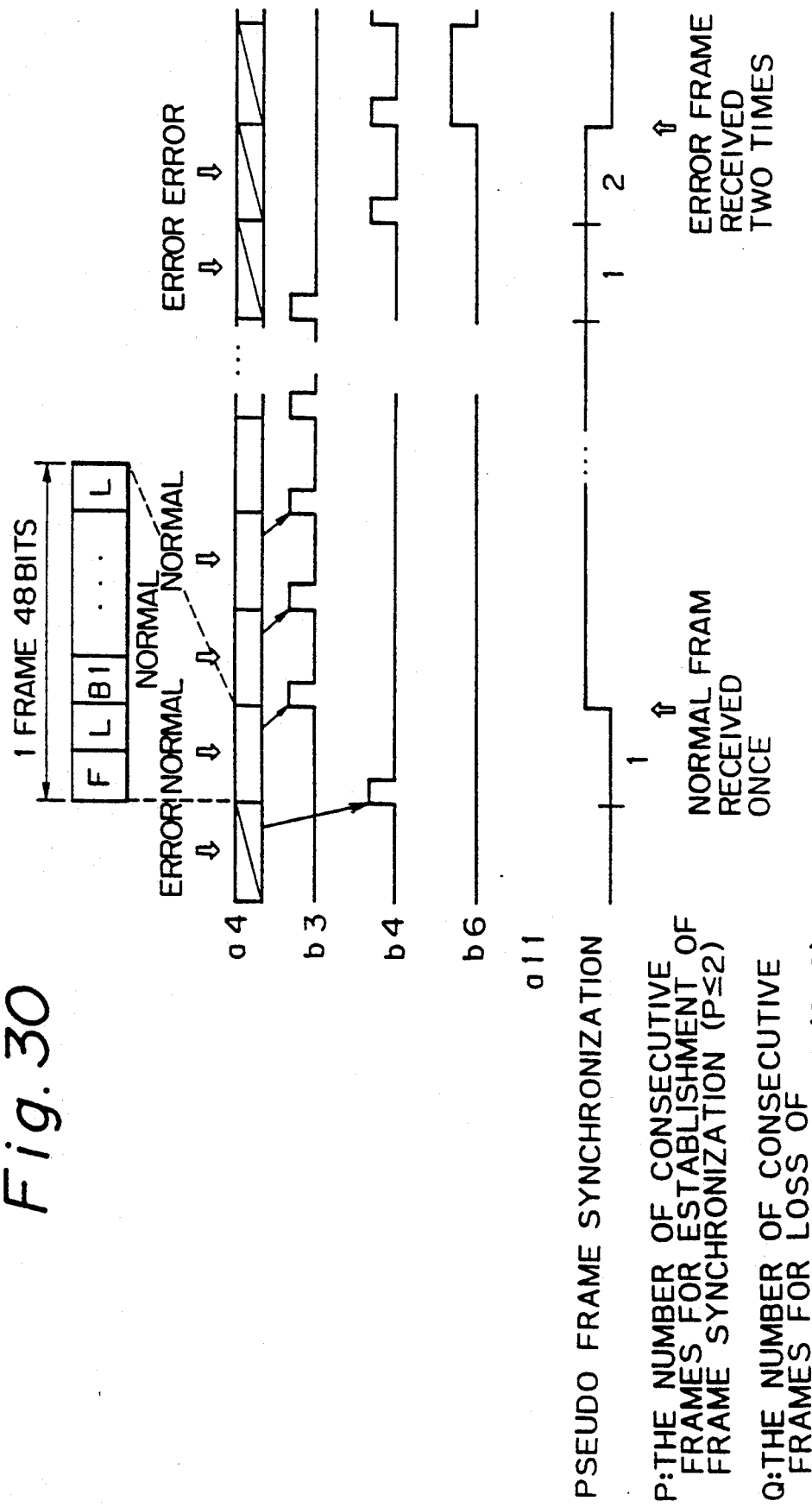

FRAME SYNCHRONIZATION DEPENDENT TYPE BIT SYNCHRONIZATION EXTRACTION CIRCUIT

BACKGROUND OF THE INVENTION

1. Field of the Invention

The present invention relates to a bit synchronization extraction circuit used for bit synchronization in an integrated service digital network (ISDN) line interface connected to a reference point S/T of an ISDN basic user network interface, and more particularly relates to a bit synchronization extraction circuit which is dependent on frame synchronization.

The bit synchronization extraction is included in an ISDN line interface which is included in an ISDN terminal equipment (TE) connected through the reference point S/T to a network termination (NT).

In the ISDN terminal equipment (TE), to enable smooth bidirectional communication, the transmitting signal must be synchronized with the received signal. To this end, the bit synchronization extraction circuit generates a bit timing signal which is synchronized with the received signal. The bit timing signal is used as a clock signal for the transmitting signal.

In the bit synchronization extraction circuit, it is desirable that the timing extraction jitter be as small as possible, and that the bit timing be stable in the presence of line noise.

According to the recommendation of CCITT, the bit timing extraction jitter in the transmitting signal with respect to the received signal must be within ±7 percent of the bit period.

2. Description of the Related Art

Conventionally, there are two types of bit synchronization extraction circuits, i.e., a counter preset mode circuit and a digital phase locked loop (DPLL) mode circuit.

The conventional counter preset mode circuit has an advantage of a short time for extraction of the bit synchronization, but had the disadvantage of being sensitive against line noise and having a large timing extraction jitter.

Conventional DPLL mode has the advantage of also being resistant to line noise and having small timing extraction jitter, but has the disadvantage of taking a long time for bit synchronization extraction. That is, the amount of correction until establishment of bit synchronization could be 2.6 $\mu$s (5.2 $\mu$s/2) in the worst case. There is the disadvantage of the long time taken for establishment of bit synchronization due to the correction of this in steps of less than 0.36 $\mu$s (5.2 $\mu$s×0.07). For example, if correction is made in steps of 0.16 $\mu$s, 16 steps of correction (2.6 $\mu$s÷0.16 $\mu$s) is required until establishment of bit synchronization. Therefore, if there were eight protection stages, points of change of data of 128 bits (16 steps×8 stages) would be required. Since there are four points of change of data in the 48 bits of one frame (250 $\mu$s) in the minimum case, the maximum time for establishment of synchronization would be 8 ms (128 bits/4×250 $\mu$s).

The ISDN terminal equipment uses the bit timing extracted by the bit synchronization extraction circuit for transmiting data to the line. To ensure the restriction in transmitting data, i.e., to ensure a bit timing jitter within ±7 percent (0.36 $\mu$s), the latter DPLL mode has been used, since the restriction cannot be met by the former.

SUMMARY OF THE INVENTION

An object of the present invention is to provide a frame synchronization dependent type bit synchronization extraction circuit in which the timing extraction jitter is as small as possible, and the bit timing is stable in the presence of line noise.

The restriction on the bit timing jitter is a restriction for data transmission from the ISDN terminal equipment. Therefore, the operation of the DPLL for bit synchronization is made dependent on the frame synchronization in operation.

Therefore, use is made of the fact that data is transmitted to the ISDN line from the ISDN terminal equipment connected to the ISDN user network interface only when synchronization of the received data has been established and when out of synchronization, data is not transmitted.

According to one aspect of the present invention, provision is made of a bit synchronization extraction circuit characterized by having the function of presetting the counter unit and extracting bit synchronization at the point of change of the received signal by a change point detection unit when frame synchronization is not detected, having the function of comparing the phases of, for example, 192 kHz bit timing produced by division from the internally free-running oscillation circuit and the signal received from the network terminal NT and correcting the bit timing by the phase difference when frame synchronization is detected, and switching the bit synchronization extraction system depending on the frame synchronization, whereby it is made possible to shorten the bit synchronization extraction time and, after frame synchronization has been established, due to the resistance to line noise and the small timing extraction jitter, ensure a bit timing extraction jitter, a restriction in data transmission, of within ±7 percent (0.36 $\mu$s).

Further, according to another aspect of the present invention, provision is made of a bit synchronization extraction circuit characterized by having a pseudo-frame synchronization circuit with no more than two as the number of consecutive normal frames for establishment of frame and at least two synchronization as the number of consecutive error frames for loss of frame synchronization, having the function of presetting the counter unit and detecting bit synchronization at the point of change of the received signal by a change point detection unit when pseudo frame synchronization is not detected, having the function of comparing the phases of the 192 kHz bit timing produced by division from the internally free-running oscillation circuit and the signal received from the NT and correcting the bit timing by the phase difference when pseudo-frame synchronization is detected, and switching the bit synchronization extraction system depending on the pseudo-frame synchronization, whereby it is made possible to shorten the bit synchronization extraction time and, when frame synchronization has been established, due to the resistance to line noise and the small timing extraction jitter, ensure a bit timing extraction jitter, a restriction in data transmission, of within ±7 percent (0.36 $\mu$s).

According to the present invention, by switching the bit synchronization extraction system depending on the frame synchronization, it is possible to shorten the bit synchronization extraction time and, after establishment of frame synchronization, due to the resistance to line noise and small timing extraction jitter, ensure a bit timing extraction jitter, a restriction when transmitting data, of within ±7 percent (0.36 μs).

The restriction on the bit timing jitter is a restriction for data transmission. Therefore, the operation of the DPLL for bit synchronization is made dependent on the frame synchronization in operation.

Therefore, using the fact that data is transmitted to the ISDN line from the ISDN terminal connected to the ISDN user network interface only when synchronization of the received data has been established and when out of synchronization, data is not transmitted, One aspect of the present invention presets the counter unit and extracts bit synchronization at the point of change of the received signal by a change point detection unit when frame synchronization is not detected (that is, until reception of three consecutive normal frames). The operation at that time is the same as the counter preset mode. Further, when frame synchronization is detected, it compares the phases of the 192 kHz bit timing produced by division from the internally free-running oscillation circuit and the signal received from the NT and corrects the bit timing by the phase difference when frame synchronization is detected. This operation is the same as the DPLL mode.

Another aspect of the present invention has a pseudo frame synchronization unit with P as the number of consecutive normal frames for establishment of frame synchronization (P≧2) and Q≧2 as the number of consecutive error frames for loss of frame synchronization, and presets the counter unit and detects bit synchronization at the point of change of the received signal by a change point detection unit when pseudo-frame synchronization is not detected (that is, until reception of P number of normal frames). The operation at this time is the same as the counter preset mode. Further, it compares the phases of the 192 kHz bit timing produced by division from the internally free-running oscillation circuit and the signal received from NT and corrects the bit timing by the phase difference when pseudo-frame synchronization is detected. The operation at this time is the same as the DPLL mode. At least one frame of time is ensured between the establishment of pseudo-frame synchronization and establishment of frame synchronization.

BRIEF DESCRIPTION OF THE DRAWINGS

The above object and features of the present invention will be more apparent from the following description of the preferred embodiments in comparison with the prior art with reference to the accompanying drawings, wherein:

FIG. 9 is an explanatory view of the operation of the apparatus of FIG. 7 in the case of a delay;

FIG. 30 is an explanatory view of the operation of the unit 40 in FIG. 29.

DESCRIPTION OF THE PREFERRED EMBODIMENTS

For better understanding of the present invention, the technical field of the present invention and the conventional arts are first described with reference to FIG. 1 to FIG. 9.

Figure 1:
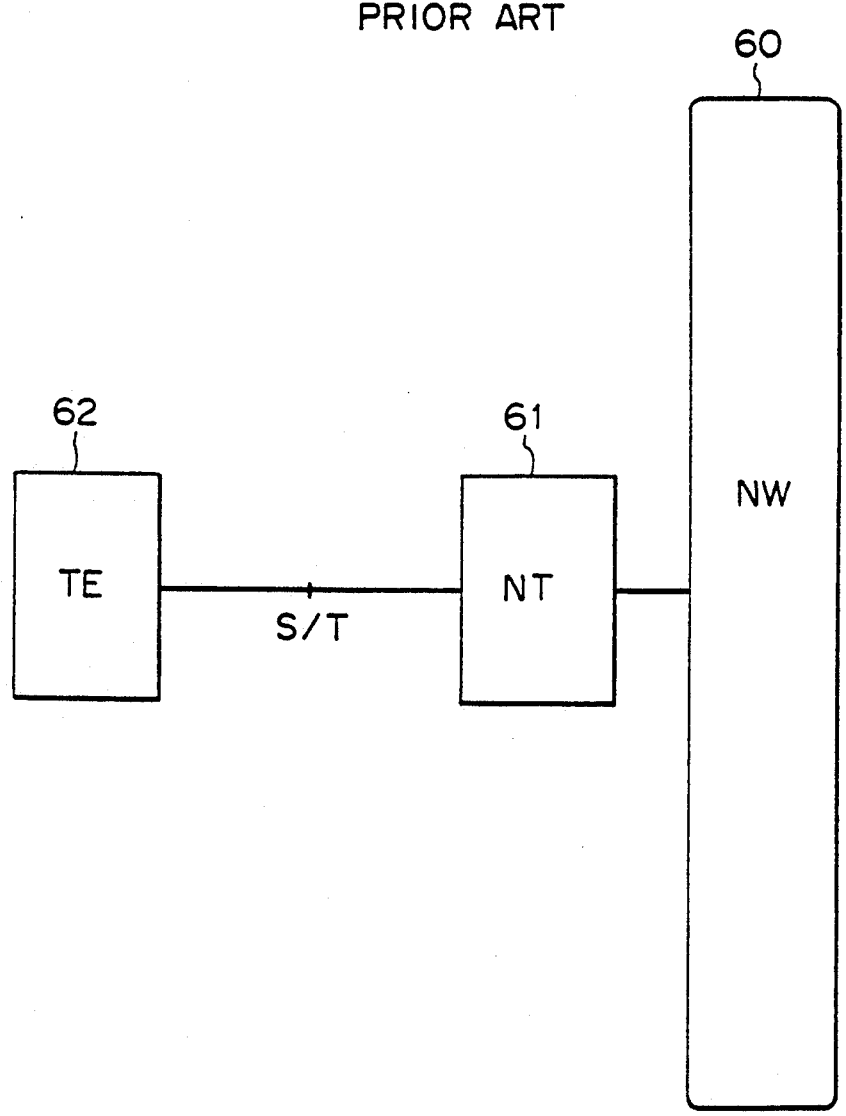
FIG. 1 is a block diagram showing the system construction in the field of utilization in industry of the present invention.

The construction of a system including a reference point S/T of an ISDN basic user network interface is shown in FIG. 1. In the figure, a network termination (NT) 61 connected to a network 60 is connected with an ISDN terminal equipment (TE) 62 through the S/T point.

Figure 2:
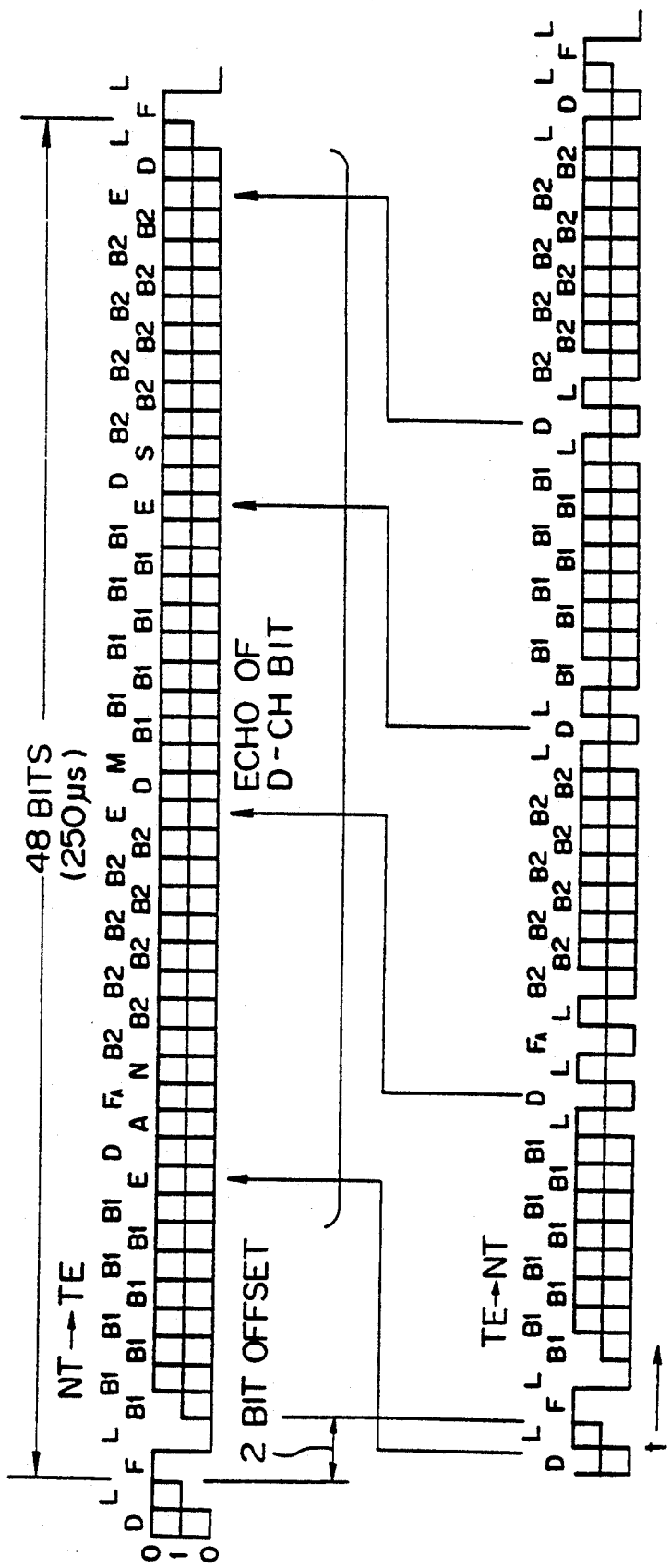
FIG. 2 is a view of the frame construction of data in an ISDN network in the field of utilization in industry of the present invention.

The frame construction of a signal sent between the network termination (NT) 61 and the ISDN terminal equipment (TE) 62 is shown in FIG. 2. As shown in the figure, in the ISDN basic user network interface, data is transmitted in both directions at a speed of 192 kbit/s (bit period is 5.2 μs) with 48 bits used as one frame (250 μs).

To enable communication between the ISDN terminal equipment (TE) 62 and network termination (NT) 61, the ISDN terminal equipment (TE) 62 and the network termination (NT) 61 must operate at the same timing. However, the 192 kHz clock, as it is, produced by frequency division by the oscillator at the ISDN terminal equipment (TE) 62, is usually off in phase from the timing of the signal received from the network termination (NT) 61, so mutual communication is not possible.

Therefore, the terminal equipment (TE) 62 must have the function of bit synchronization for making the 192 kHz clock produced by frequency division by the oscillator match with the timing of the received signal in both frequency and phase.

Figure 3:
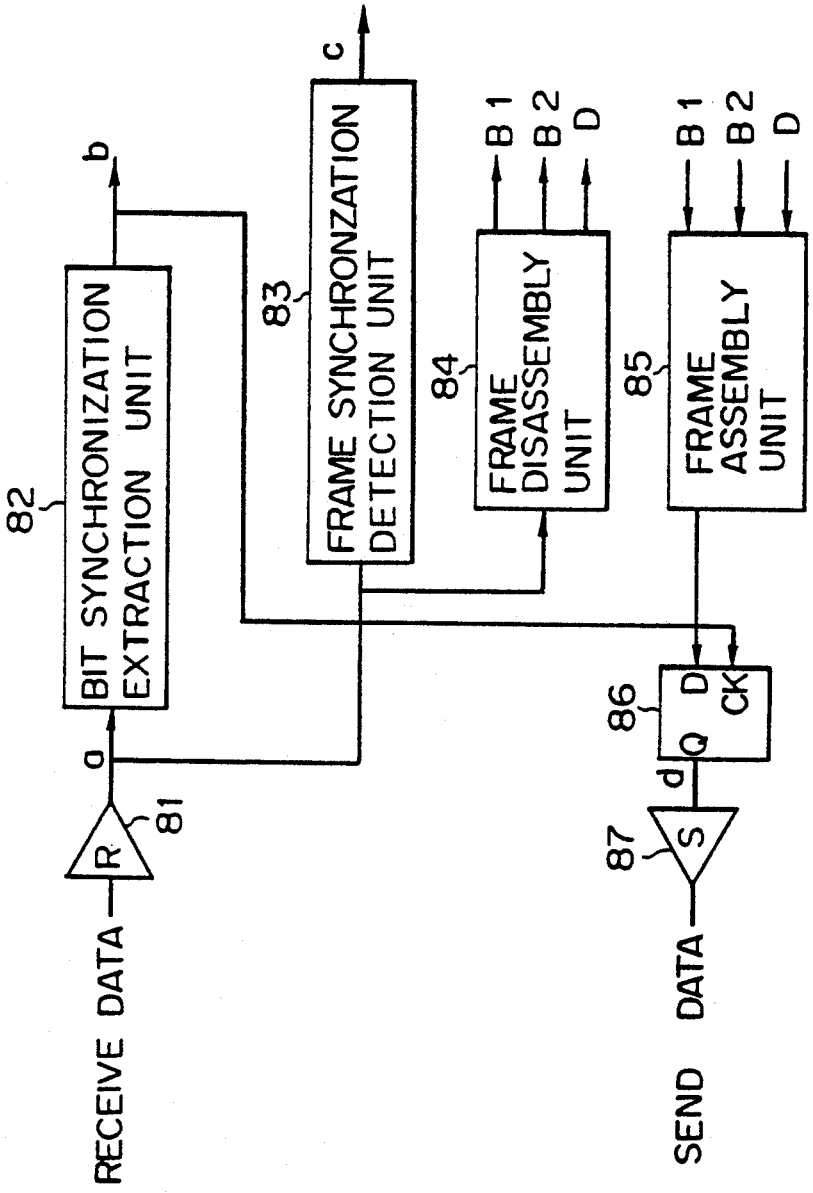
FIG. 3 is a block diagram showing the ISDN line interface as a background to the present invention.

FIG. 3 is a block diagram showing the construction of a conventional ISDN line interface in the ISDN terminal equipment (TE) 62. In the figure, 81 is a receiver, 82 is a bit synchronization extraction unit, 83 is a frame synchronization detection unit, 84 is a frame disassembly unit, 85 is a frame assembly unit, 86 is a flipflop, and 87 is a driver.

The receiver 61 receives data from the network termination (NT) 61 through the ISDN line.

The bit synchronization extraction unit 82 extracts the 192 kHz bit timing from the signal received from the network terminal (NT) 61 for the bit synchronization.

The frame synchronization detection unit 83 deems that frame synchronization has been established when a normal 48 bit frame is successively received three times from the received signal for frame synchronization.

The ISDN terminal equipment (TE) 62, when deeming that frame synchronization has been established, produces a 4 kHz frame timing from the frame construction and starts the disassembly of the received data, the assembly of the transmitting data, and the transmission of the signal. Further, when a normal 48 bit frame cannot be received two times in a row, it deems that loss of frame synchronization has occurred and must immediately stop signal transmission. Subsequent to this, it starts the detection of frame synchronization again.

The ISDN terminal equipment (TE) 62 must synchronize the transmitting signal to the bit timing extracted by the bit synchronization extraction unit 82. The bit timing extraction jitter when observed by the transmitting signal is regulated to within ±7 percent (0.36 μs) of the bit period, so the 192 kHz bit timing extracted with establishment of bit synchronization must be within ±7 percent (0.36 μs) of the received signal.

Figure 4:
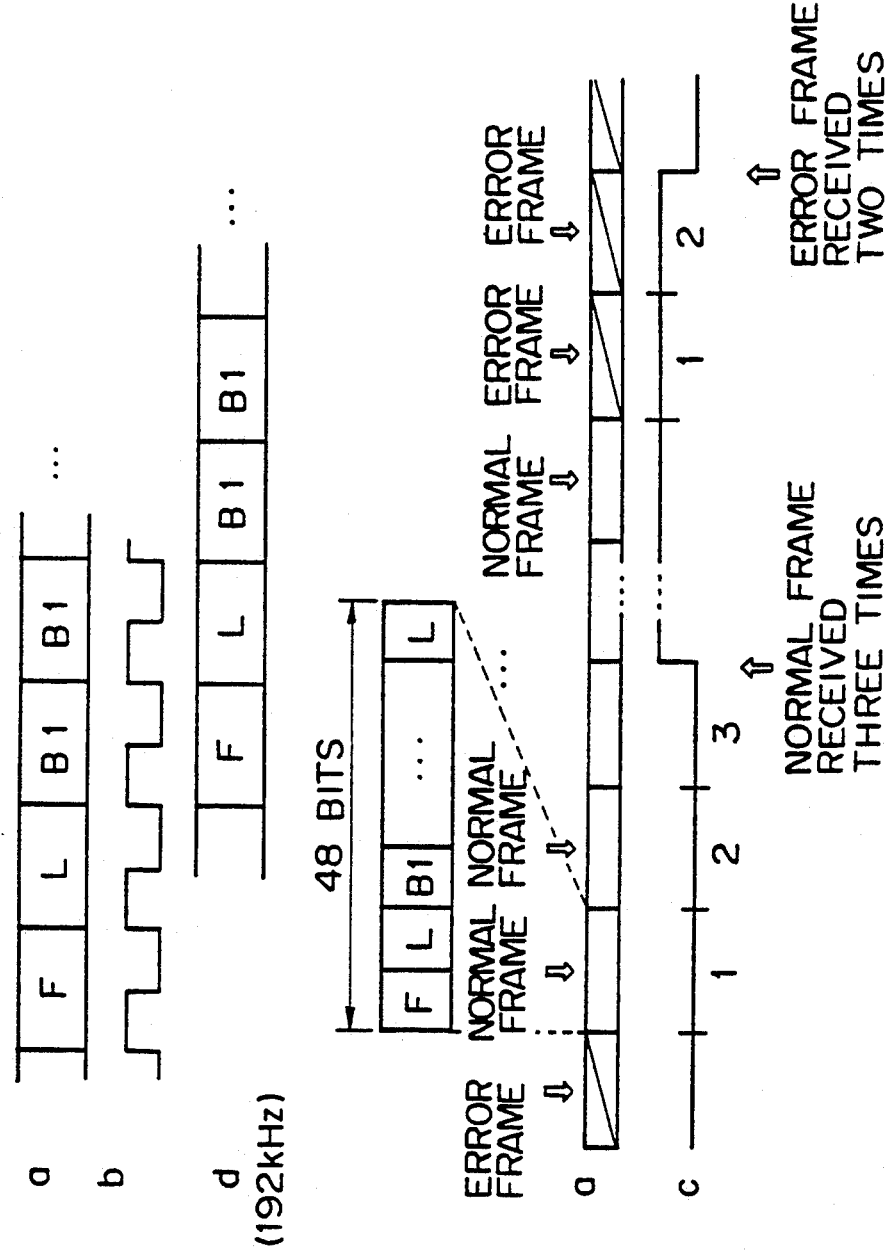
FIG. 4 is an explanatory view of the operation of the apparatus of FIG. 3.
Figure 5:
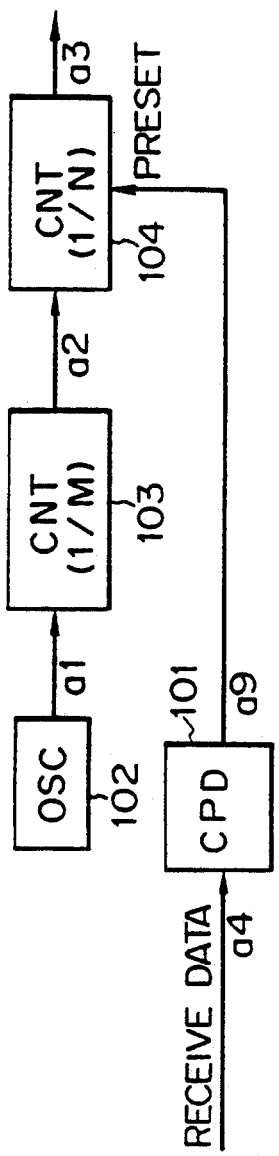
FIG. 5 is a block diagram showing an example of the conventional bit synchronization extraction unit.
Figure 6:
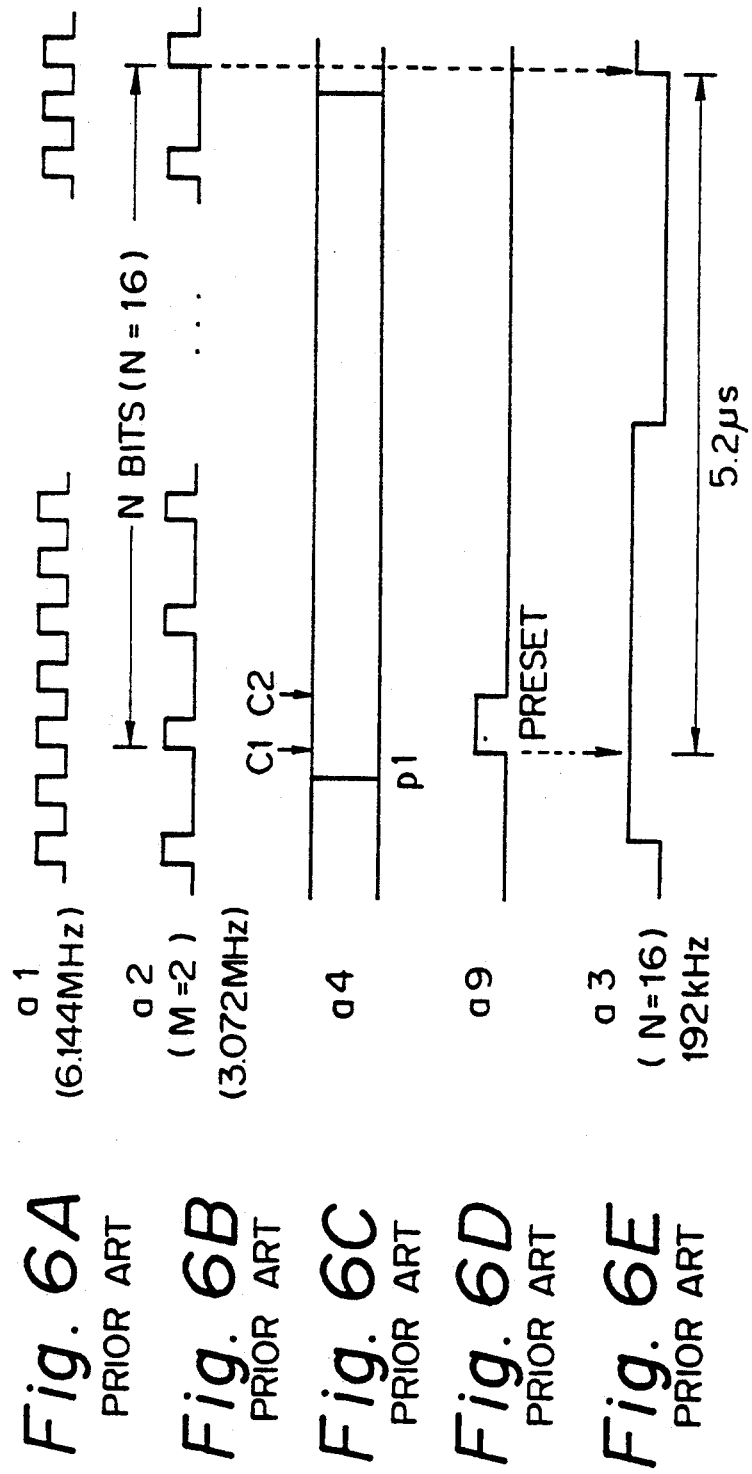
FIG. 6A, 6B, 6C, 6D and 6E are explanatory views of the operation of the apparatus of FIG. 5.

The operation of the ISDN line interface of FIG. 3 will be explained by FIG. 4. The signal (a) received by the receiver 81 enters the bit synchronization extraction unit 82, the frame synchronization detection unit 83, and the frame disassembly unit 84. At the bit synchronization extraction unit 82, a 192 kHz bit timing signal (b) synchronized with and having the same phase as the received signal is prepared. The frame synchronization detection unit 83, when receiving three normal frames in a row, outputs "1" as the frame synchronization signal (c) to show that frame synchronization has been established and, when not able to receive two normal frames in a row, outputs "0" as the frame synchronization signal (c) to show or indicate a loss of frame synchronization has occurred. At the frame disassembly unit 84, the received signal is disassembled into B1, B2 and D when frame synchronization is established. At the frame assembly unit 85, when frame synchronization has been established, B1, B2, and D are assembled into frames and the flipflop 86 is used to match the phase to the bit timing signal (b) from the bit synchronization extraction unit 82, produce the transmitting data, and send it out through the driver 87.

The present invention relates to the bit synchronization extraction unit 82 in the above ISDN user network interface.

In the bit synchronization extraction unit 82, it is desirable that the bit synchronization extraction time be as short as possible, that the timing extraction jitter be as small as possible, and that the bit timing be stable with respect to line noise.

Conventional bit synchronization extraction units came in a counter preset mode and a DPLL mode.

The counter preset mode is explained using FIG. 5 and FIGS. 6A–6E. In the figures, the change point detection unit (or "CPD") 101 detects the point of change of the data a4 received from the line and generates a pulse a9. On the other hand, the clock signal a1 from the free-running oscillation unit (or "OSC") 102 is divided by the counter unit (or "CNT (1/M)") 103 to make a2, and the counter unit (or "CNT (1/N)") 104 generating the bit timing is preset by the pulse from the change point detection unit 101.

More specifically, to generate the bit timing signal a3 (FIG. 6E) of $\alpha$Hz ($\alpha = 192 \times 10^3$) synchronized with the received signal, the free-running signal a1 (FIG. 6A) of $\beta$Hz ($\beta = \alpha \times M \times N$, where M and N are integers, for example, M=2 and N=16 for $\beta = 6.144 \times 10^6$) is prepared by the oscillation unit 102. This signal a1 is divided to 1/M by the counter unit 103 to make the signal a2 (FIG. 6B), while the signal a2 is divided to 1/N by the counter unit 104. The change point detection unit 101 detects the point of change p1 of the received signal and generates the pulse a9 (FIG. 6D) from the clock timings C1 and C2 by the signal a1. This pulse a9 is used to preset the counter unit 104. The counter unit 104 starts to count the 5.2 μs of bit period from the rising edge of the pulse a9. In this way, a bit timing signal of $\alpha$Hz synchronized with the received data is obtained.

This counter preset system establishes bit synchronization immediately at the point of change of the received signal, but has the defects that the bit timing is immediately affected by line noise included in the received data and there is a large timing extraction jitter due to the presetting of the counter 104.

Figure 7:
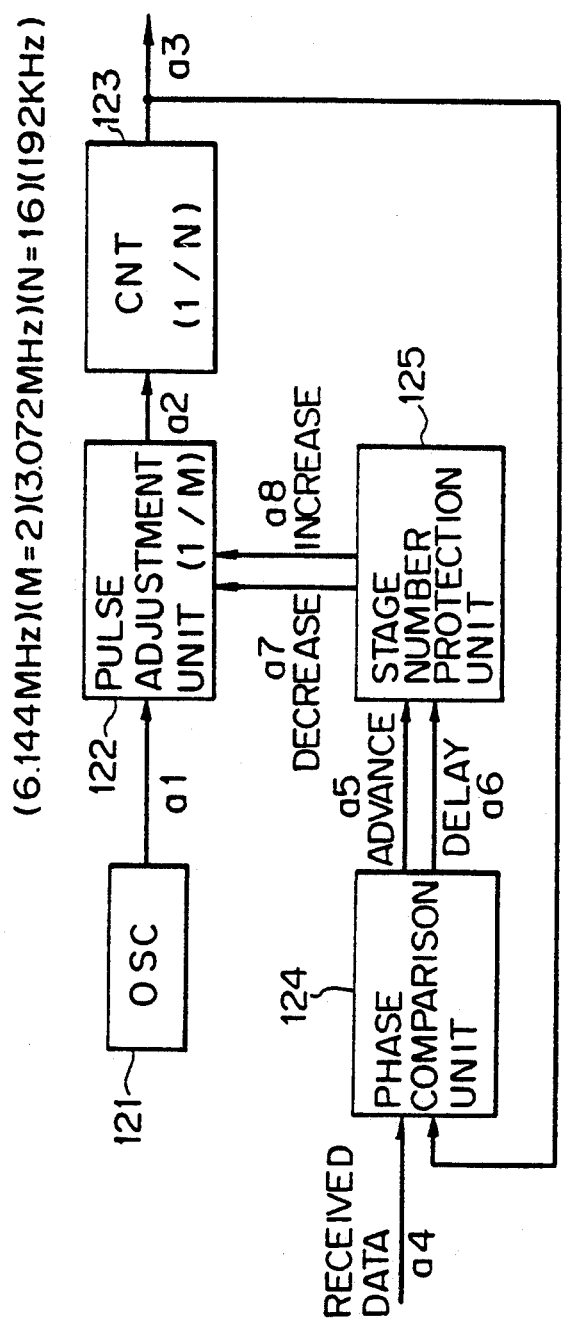
FIG. 7 is a block diagram showing another example of a conventional bit synchronization extraction unit.
Figure 8:
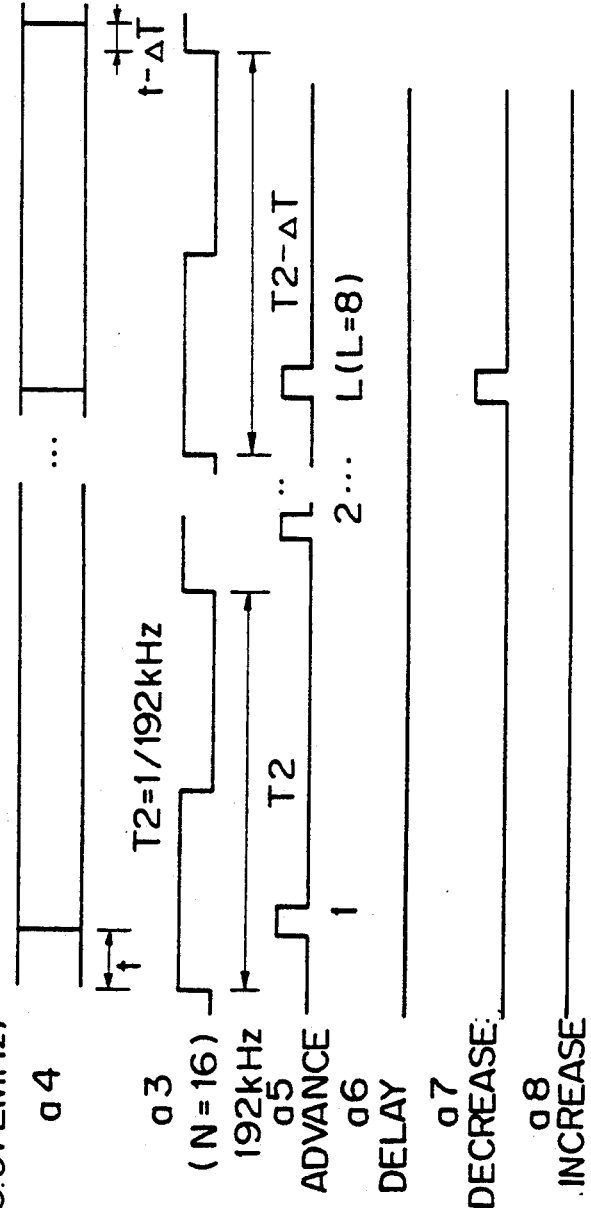
FIG. 8 is an explanatory view of the operation of the apparatus of FIG. 7 in the case of an advance.
Figure 9:
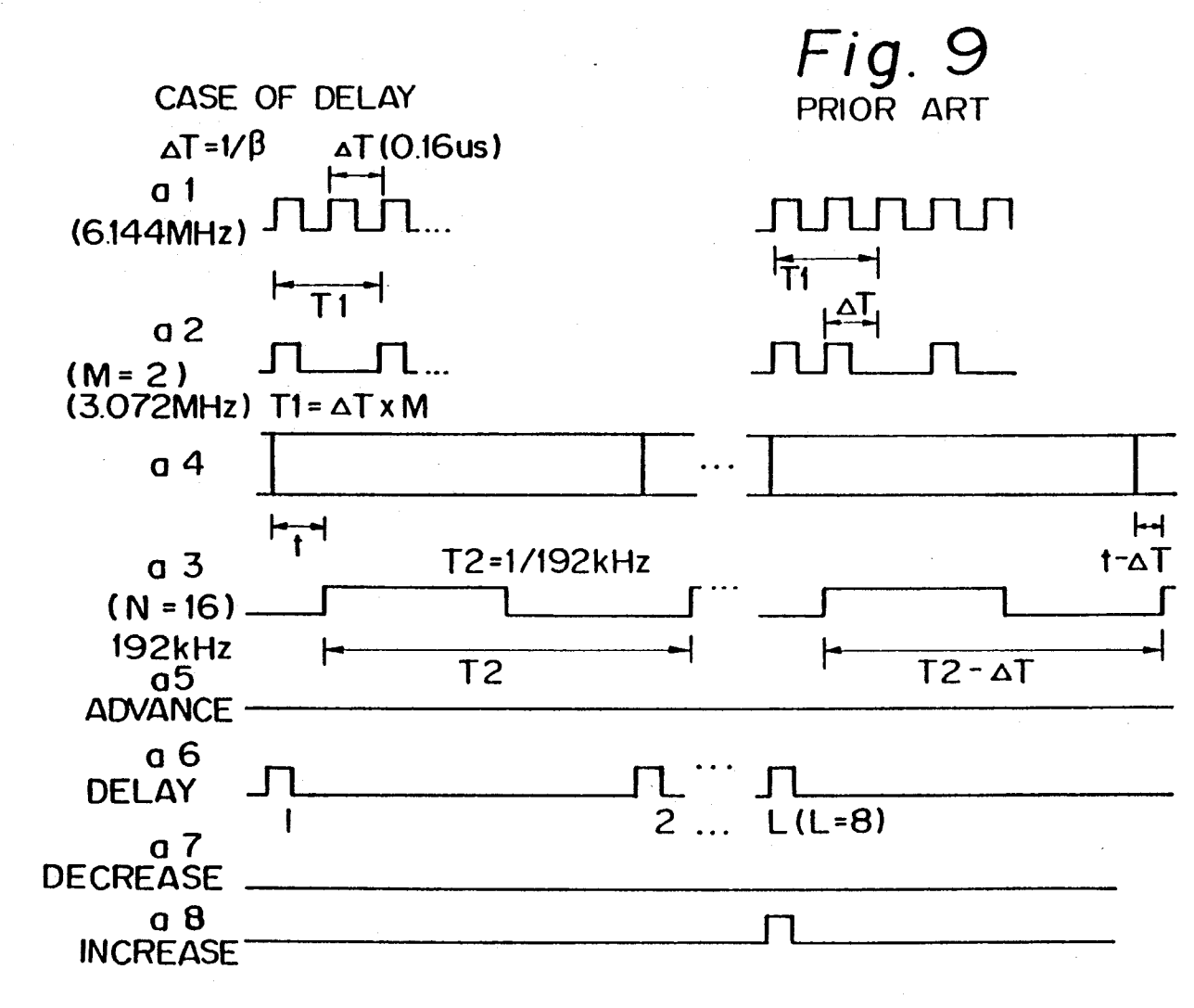

The DPLL (digital phase locked loop) system will be explained using FIG. 7, FIG. 8, and FIG. 9. This system compares the phases of the bit timing signal a3 produced by frequency division from the internally free-running oscillator 121 and the data received from the line and uses the phase difference to correct the bit timing.

More specifically, the bit synchronization extraction unit of the DPLL system, to produce the bit timing signal a3 of $\alpha$Hz ($\alpha = 192 \times 10^3$) synchronized with the received data a4, is comprised of an oscillation unit (or "OSC") 121 which prepares a free-running signal a1 of $\beta$Hz ($\beta = \alpha \times M \times N$, where M and N are integers, for example, when M=2 and N=16, $\beta = 6.144 \times 10^6$), a pulse adjustment unit (or "pulse adjustment unit (1/M)") 122 which divides the signal a1 to 1/M and further adjusts the increase or decrease of the pulse, a counter unit (or "CNT(1/N)") 123 which divides the output a2 of the pulse adjustment unit 122 by 1/N, and prepares a bit timing signal a3 synchronized by bit with the received data a4, a phase comparison unit 124 which compares the phases of the received data a4 and the bit timing signal a3 of the output of the counter unit 123 and, when the bit timing is advanced, outputs an advance pulse a5 and when the bit timing is delayed, outputs a delay pulse a6, and a stage number protection unit 125 which outputs to the pulse adjustment unit 122 a decrease command signal a7 when the advance pulse a5 is continuously generated L number of times (for example, L=8) without occurrence of a delay pulse a6 during that time and outputs an increase command signal a8 to the pulse adjustment unit 122 when the delay pulse a6 is continuously generated L number of times (for example, L=8) without an advance pulse a5 occurring during that time.

When the phases of the received data a4 and the bit timing signal a3 output from the counter unit 123 are compared and the bit timing is ahead, an advance pulse a5 is generated from the phase comparison unit 124. When the advance pulse a5 is continuously generated L number of times (for example, L=8), a decrease command signal a7 is output to the pulse adjustment unit 122, which pulse adjustment unit 122 reduces the pulses. Therefore, when divided by 1/N by the counter unit 123, the bit timing becomes delayed by exactly $1/\beta$ (0.16 $\mu$s when $\beta=6.144$ MHz) seconds of one step and the phase of the received data a4 is approached. By repeating this, gradually the phase of the bit timing signal a3 matches that of the received data a4.

When comparing the phases of the received data a4 and the bit timing signal a3 of the output of the counter unit 123 and the bit timing is delayed, a delay pulse a6 is generated from the phase comparison unit 124. If the delay pulse a6 is continuously generated L times (for example, L=8), an increase command signal a8 is output to the pulse adjustment unit 122 and the pulses are increased by the pulse adjustment unit 122. Therefore, when the output signal a2 of the pulse adjustment unit 122 is divided by 1/N by the counter unit 123, the bit timing signal a3 advances by exactly $1/\beta$ (0.16 $\mu$s when $\beta=6.144$ MHz) of one step and the phase of the received data is approached. By repeating this, gradually the phase of the bit timing signal a3 matches the phase of the received data a4.

In this method, if bit synchronization is obtained and the phases are made to match, the bit timing becomes stable with respect to line noise and, further, corrections are made in step amounts, so the timing extraction jitter is $1/\beta$ seconds (in this example, 0.16 $\mu$s).

In this way, the conventional counter preset mode had the advantage of a short time for extraction of the bit synchronization, but had the disadvantage of being sensitive against line noise and having a large timing extraction jitter.

Further, the conventional DPLL mode had the advantage of also being resistant to line noise and having small timing extraction jitter, but had the disadvantage of a long bit synchronization extraction time. That is, the amount of correction until establishment of bit synchronization could be 2.6 $\mu$s (5.2 $\mu$s/2) in the worst case. There was the disadvantage of the long time taken for establishment of bit synchronization due to the correction of such bit synchronization in steps of less than 0.36 $\mu$s (5.2 $\times$ 0.07). For example, if correction is made in steps of 0.16 $\mu$s, 16 steps of correction (2.6 $\mu$s $\div$ 0.16 $\mu$s) would be required until establishment of bit synchronization. Therefore, if there were eight protection stages, points of change of data of 128 bits (16 steps $\times$ 8 stages) would be required. Since there are four points of change of data in the 48 bits of one frame (250 $\mu$s) in the minimum case, the maximum time for establishment of synchronization would be 8 ms (128 bits/4$\times$250 $\mu$s).

The ISDN terminal equipment uses the bit timing extracted by the bit synchronization extraction circuit 82 for transmitting data to the line. To ensure the restriction in transmitting data, i.e., to ensure a bit timing jitter within $\pm$7 percent (0.36 $\mu$s), the latter DPLL mode has been used, since the restriction cannot be met by the former.

Now, embodiments of the present invention will be described in the following.

Figure 10:
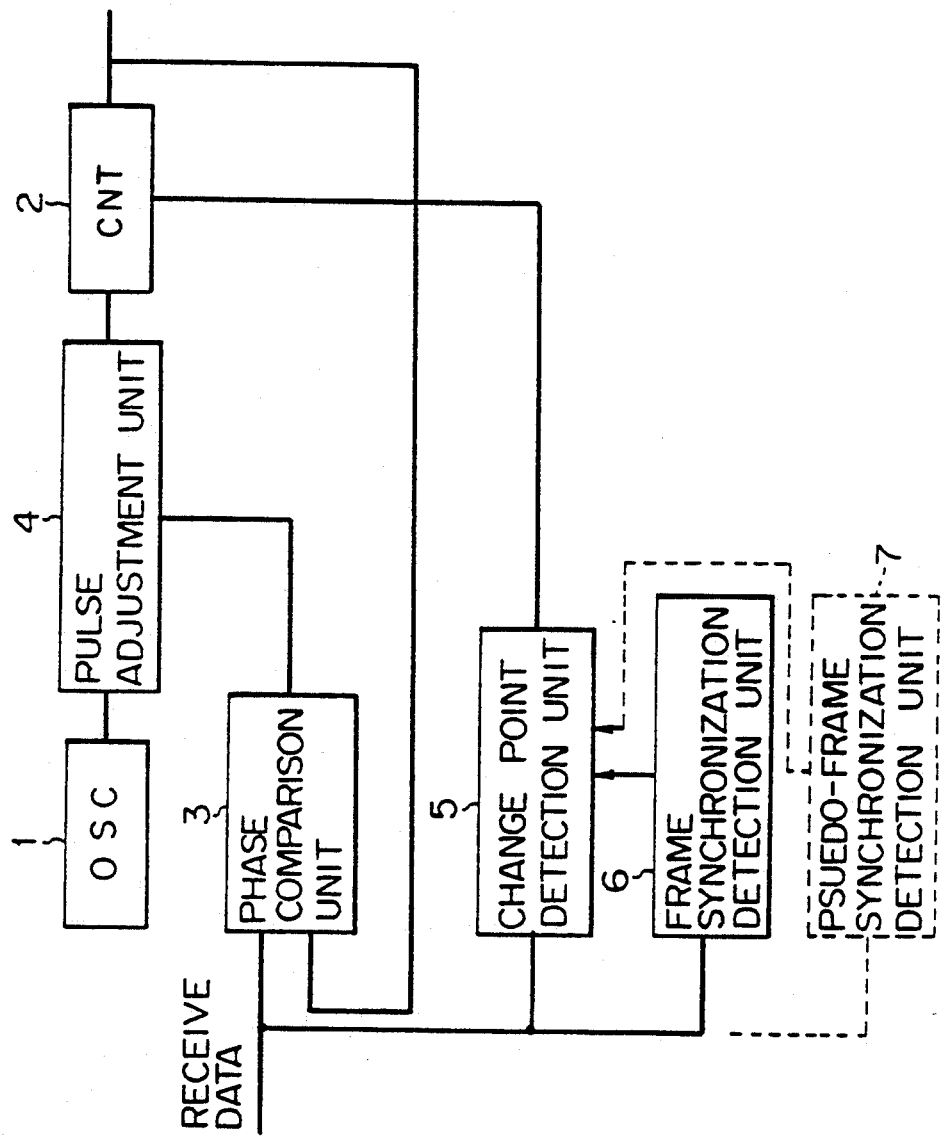
FIG. 10 is a block diagram showing the principle of the present invention.

FIG. 10 is a block diagram of the principle of the present invention. In the figure, there is shown a bit synchronization extraction in an ISDN terminal equipment connected to a reference point S/T of an ISDN basic user network interface, for establishing bit synchronization between an internally produced signal and a received signal, wherein 1 is an oscillation unit (or "OSC") which generates a free-running signal; 2 is a counter unit (or "CNT") which divides the free-running signal and produces a bit synchronization signal of a desired frequency; 3 is a phase comparison unit which compares the phases of the output signal of the counter unit 2 and the received data; 4 is a pulse adjustment unit which adjusts the number of pulses of the free-running signal in accordance with the phase difference obtained at the output of the phase comparison unit 3; 5 is a change point detection unit, which detects a point of change of the received data; and 6 is a frame synchronization detection unit which detects the frame synchronization from the received data. When the frame synchronization detection unit 6 does not detect frame synchronization, the counter unit 2 is preset at the point of change of the received data by the change point detection unit 5 and the bit synchronization is extracted and, when the frame synchronization detection unit 6 detects frame synchronization, the number of pulses of the free-running signal is changed in accordance with the phase difference obtained at the output of the phase comparison unit 3.

In place of the frame synchronization detection unit 6, use may be made of a pseudo-frame synchronization detection unit 7 of no more than two as the number of consecutive normal frames for establishment of frame synchronization and at least two as the number of consecutive error frames for loss of frame synchronization. In this case, when the pseudo-frame synchronization detection unit 7 does not detect pseudo frame synchronization, the counter unit 2 is preset at the point of change of the received data by the change point detection unit 5 and the bit synchronization is extracted and, when the pseudo-frame synchronization detection unit 7 detects pseudo-frame synchronization, the number of pulses of the free-running signal is changed in accordance with the phase difference obtained at the output of the phase comparison unit 3.

Figure 11:
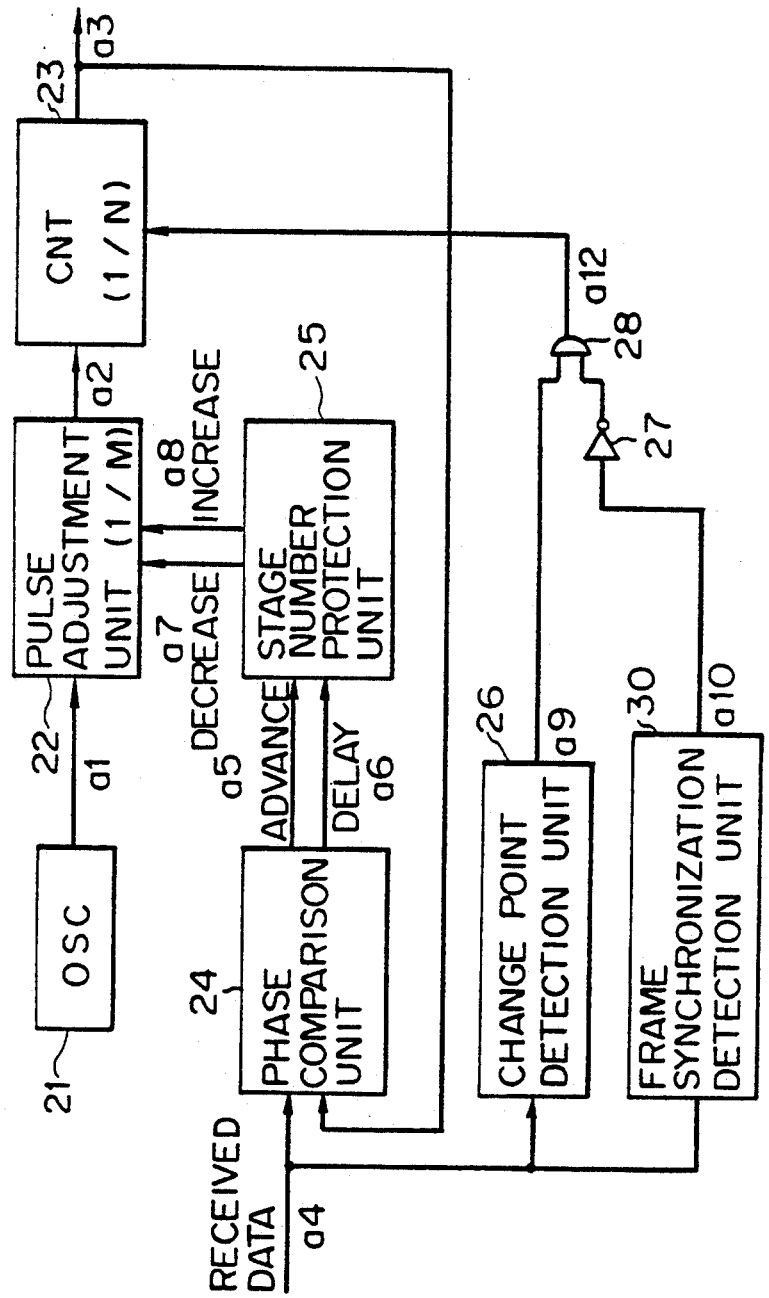
FIG. 11 is a block diagram of a bit synchronization extraction circuit according to an embodiment of the present invention.
Figure 12:
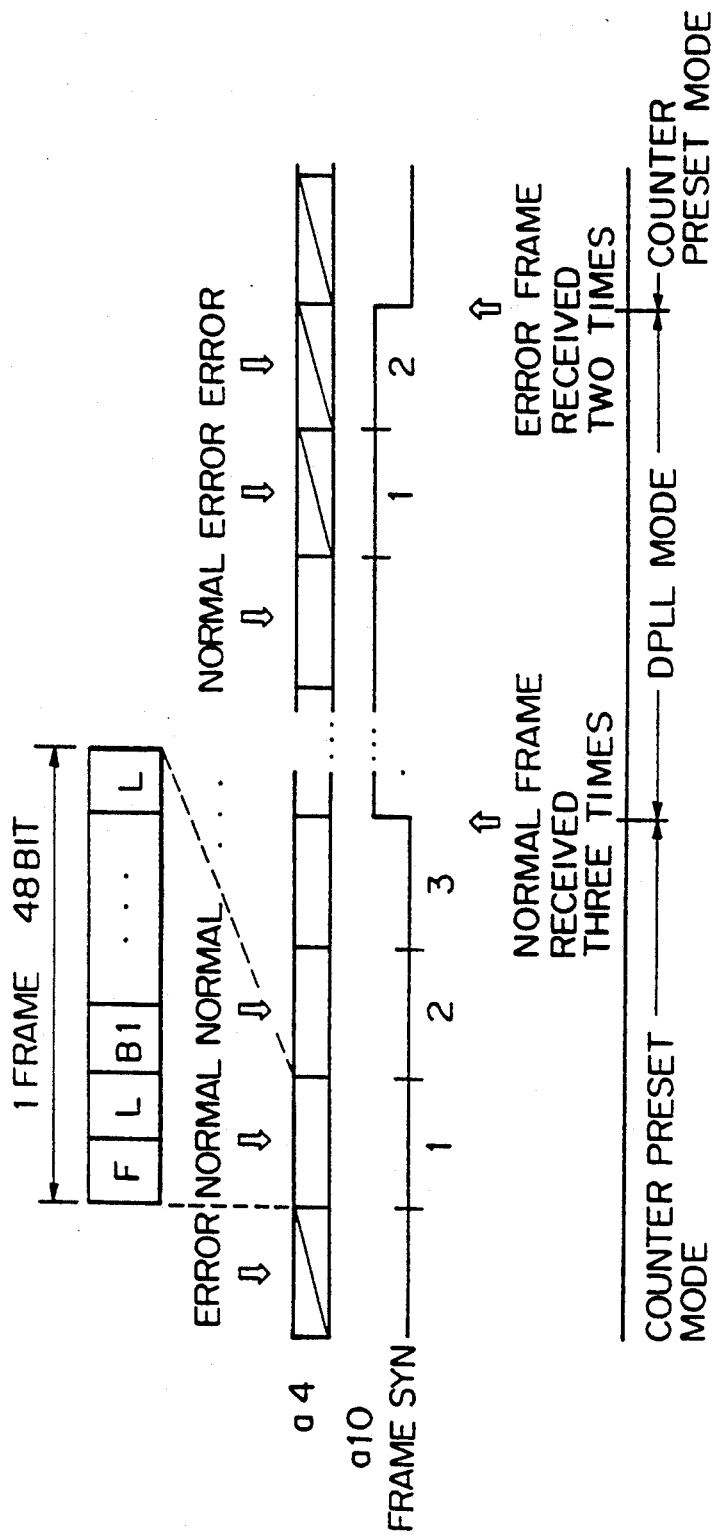
FIG. 12 is an explanatory view of the operation of the circuit of FIG. 11.

FIG. 11 is a block diagram showing the construction of a frame synchronization dependent type bit synchronization extraction circuit according to an embodiment of the present invention, while FIG. 12 is an explanatory view of the operation of the circuit of FIG. 11.

In FIG. 11, the frame synchronization dependent type bit synchronization circuit is included in an ISDN line interface in an ISDN terminal equipment (TE). To produce a bit timing signal a3 of $\alpha$Hz ($\alpha = 192 \times 10^3$) synchronized with the received data a4, the embodiment utilizes an oscillation unit (or "OSC") 21 which prepares a free-running signal of $\beta$Hz ($\beta = \alpha \times M \times N$, wherein M and N are integers, for example, when M=2 and N=16, $\beta = 6.144 \times 10^6$); a pulse adjustment unit (or "pulse adjustment unit (1/M") 22 which divides the signal a1 to 1/M and adjusts the increase or decrease of pulses; a counter unit (or "CNT (1/N") 23 which divides the output a2 of the pulse adjustment unit 22 to 1/N and prepares a bit synchronized bit timing signal a3, a phase comparison unit 24 which compares the phases of the received data a4 and the bit timing signal a3 of the output of the counter unit 23 and, when the bit timing is advanced, outputs an advance pulse a5 and when the bit timing is delayed, outputs a delay pulse a6, and a stage protection unit (or "stage number protection unit") 25 which, when L number of advance pulses a5 (for example, L=8) are generated in a row without occurrence of a delay pulse a6 during that time, outputs a decrease command signal a7 to the pulse adjustment unit 22 and, when L number of delay pulses (for example, L=8) are generated in a row without occurrence of an advance pulse a5 during that time, outputs an increase command signal a8 to the pulse adjustment unit 22. Further, it is provided with a change point detection unit 26 which detects a point of change of the received data a4 and outputs a change point detection pulse a9, a frame synchronization detection unit 30 which detects the frame synchronization from the received data and outputs a frame synchronization signal a10, an inverter 27 which inverts the frame synchronization signal a10, and an AND gate 28 which obtains the logical AND of the change point detection pulse a9 from the change point detection unit 26 and the output of the inverter 27.

The connection between the output of the counter unit 23 and an input of the phase comparison unit 24 is a PLL feedback route.

As shown in FIG. 12, the circuit of FIG. 12 operates in the counter preset mode before frame synchronization is established and in the DPLL mode after the same.

In the counter preset mode, where the frame synchronization signal a10 is a low level, the bit timing signal a3 of $\alpha$Hz ($\alpha = 192 \times 10^3$) synchronized with the received data a4 is produced by preparing a free-running signal a1 of $\beta$Hz ($\beta = \alpha \times M \times N$, where M and N are a integers, for example, when M=2 and N=16, $\beta = 6.144 \times 10^3$), dividing the signal a1 to 1/M by the pulse adjustment unit 22, and dividing the signal a2 to 1/N by the counter unit 23. The change point detection unit 26 detects a point of change of the received signal and generates a pulse a9 by the clock signal in the same way as previously described. The pulse a9 passes through the AND gate 28 and presets the counter unit 23. The counter unit 23 starts to count a bit period of 5.2 $\mu$s from the rising edge of the pulse a9. In this way, a bit timing signal of $\alpha$Hz bit-synchronized with the received data is obtained. Therefore, the bit synchronization is established immediately at a point of change of the received data a4.

When normal frames are received three times and the frame synchronization signal a10 becomes high level, the output of the invertor 27 becomes low level, the change point detection pulse a9 no longer passes through the AND gate 28, and the DPLL (digital phase locked loop) mode is entered. In this case, the phases of the bit timing signal a3 (or "feedback route signal") produced by division from the internally free-running oscillation unit 21 and the data a4 received from the line are compared by the phase comparison unit 24 and the phase difference is used to correct the bit timing. More specifically, the phases of the received data a4 and the output of the counter unit 23, i.e., the bit timing signal a3, are compared and, when the bit timing is advanced, an advance pulse a5 is generated from the phase comparison unit 24. If the advance pulses a5 continue to be generated for L number of times (for example, L=8), a decrease command signal a7 is output to the pulse adjustment unit 22, which pulse adjustment unit 22 reduces the pulses. Therefore, when divided to 1/N by the counter unit 23, the bit timing is delayed by exactly 1/$\beta$ of one step (0.16 $\mu$s when $\beta = 6.144$ MHz) and the phase of the received data a4 is approached. By repeating this, gradually the phase of the bit timing signal a3 matches the received data a4.

Further, when the phases of the received data a4 and the output of the counter unit 23, i.e., the bit timing signal a3, are compared and the bit timing is delayed, a delay pulse a6 is generated from the phase comparison unit 24. When L number of delay pulses a6 (for example, L=8) are generated in a row, an increase command signal a8 is output to the pulse adjustment unit 22, which pulse adjustment unit 22 increases the pulses. Therefore, when dividing to 1/N the signal a2 output adjustment unit 22 by the counter unit 23, the bit timing signal a3 advances by exactly 1/$\beta$ of one step (0.16 $\mu$s when $\beta = 6.144$ MHz) and the phase of the received data is approached. By repeating this, the phase of the bit timing signal a3 gradually matches the phase of the received data.

In this method, if bit synchronization is established and the phases match, the bit timing becomes stable with respect to line noise and since corrections are made in single steps, the timing extraction jitter is 1/$\beta$ second (for example, 0.16 $\mu$s).

If two error frames are received in a row, the frame synchronization signal a10 becomes low level and the process returns to the counter preset mode once again.

According to the above-mentioned embodiment explained by FIG. 11 and FIG. 12, by switching the bit synchronization extraction system depending on frame synchronization, it is possible to shorten the bit synchronization extraction time and, at establishment of frame synchronization, due to the resistance to line noise and small timing extraction jitter, ensure a bit timing extraction jitter, a restriction when transmitting data, of within ±7 percent (0.36 $\mu$s).

Figure 13A:
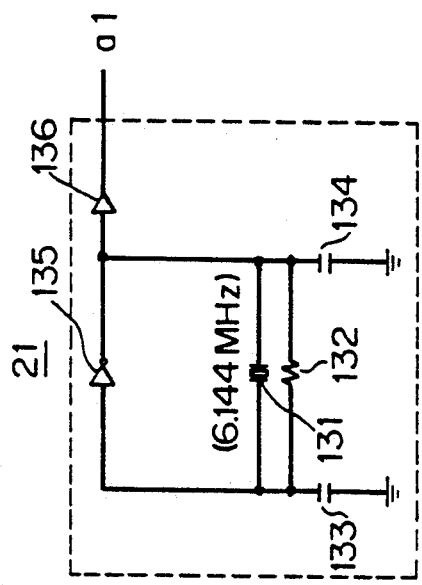
FIG. 13A is a circuit diagram of an oscillating unit 21 in the unit of FIG. 11.
Figure 13B:
FIG. 13B shows the output waveform of the oscillating unit 21 shown in FIG. 13A.

FIG. 13A is a circuit diagram of the oscillating unit 21 in the circuit shown in FIG. 11, and FIG. 13B shows waveform of the oscillating signal a1 of 6.144 MHz. As shown in FIG. 13A, the oscillating unit 21 is a well known crystal oscillator consisting of a crystal 131, a resistor 132, capacitors 133 and 134, and drivers 135 and 136.

Figure 14:
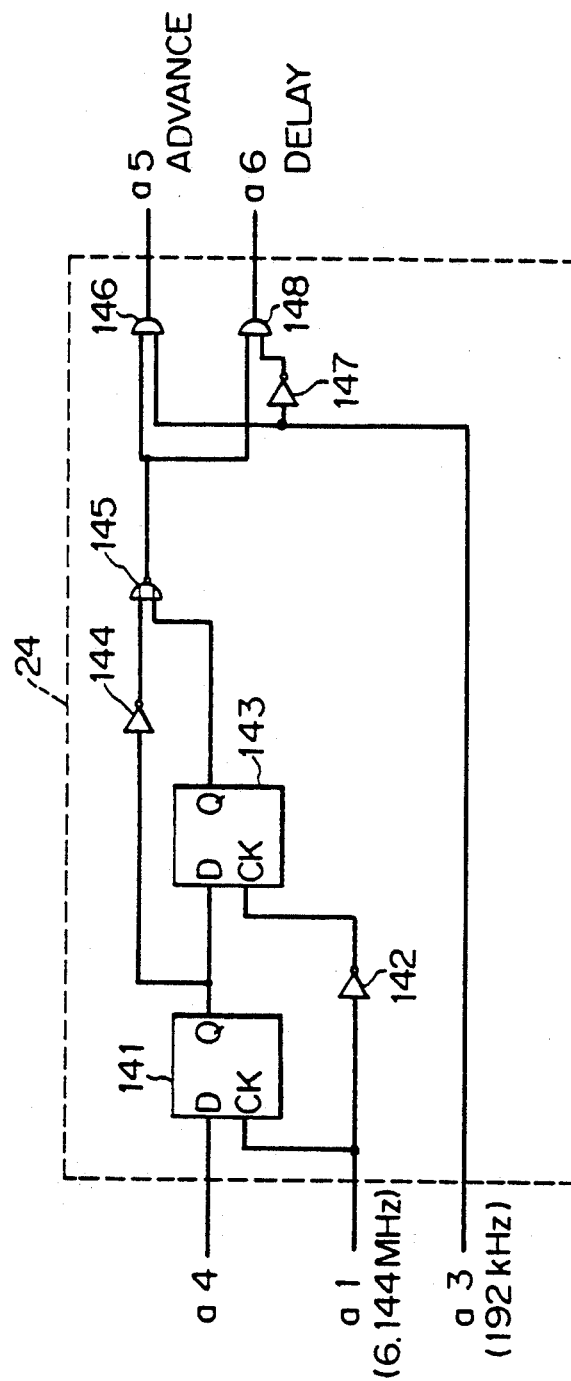
FIG. 14 is a circuit diagram of a phase comparison unit 24 in the unit of FIG. 11.
Figure 15:
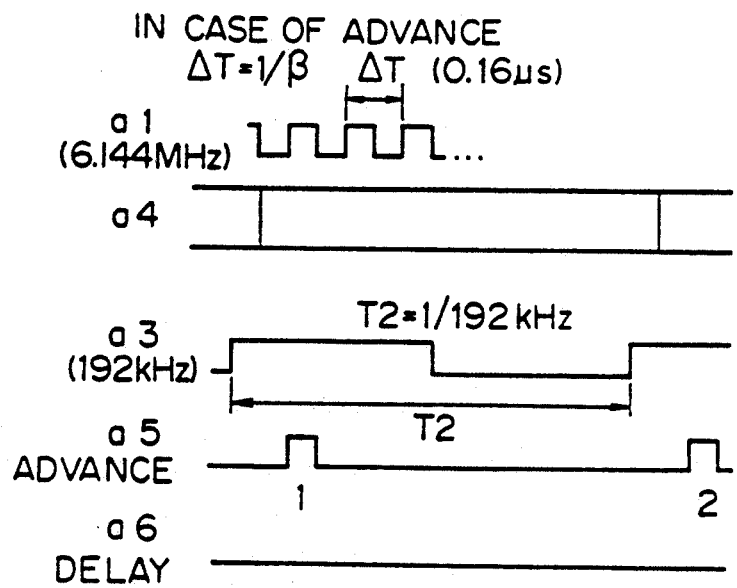
FIG. 15 is an explanatory view of the operation of the unit 24 in the case of an advance.
Figure 16:
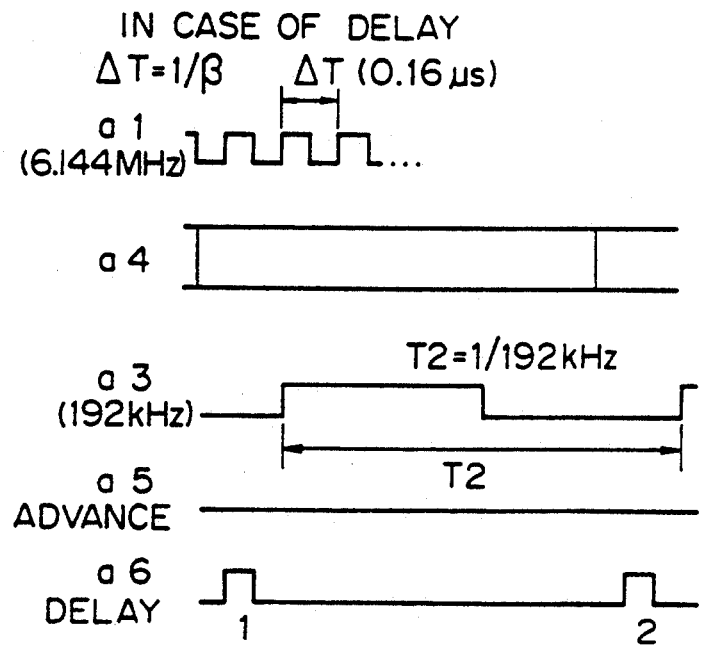
FIG. 16 is an explanatory view of the operation of the unit 24 in the case of a delay.

FIG. 14 is a circuit diagram of the phase comparison unit 24 in the circuit shown in FIG. 11, FIG. 15 is an explanatory view of the operation of the phase comparison unit 24 in the case of an advance, and FIG. 16 is an explanatory view of the operation of the phase comparison unit 24 in the case of a delay. As shown in FIGS. 14 to 16, a change of the received signal a4 is lached in a D-type flipflop 141 in response to a rise of the clock signal a1 from the oscillating unit 21. The clock signal a1 has a frequency of 6.144 MHz or has a period $\Delta T$ of 0.16 μs. The lached output of the flipflop 141 is input to the D-input of a D-type flipflop 143 in response to a clock signal which is obtained by inverting the clock signal a1 by an inverter 142. The output of the flipflop 141 is inverted by an inverter 144. The output of the inverter 144 and the output of the flipflop 143 are applied to the inputs of a NOR gate 145. The output of the NOR gate 145 and the bit timing signal a3 are applied to the inputs of an AND gate 146. The output of the NOR gate 145 and the output of an inverter 147, the input thereof is connected to the bit timing signal a3, are applied to the inputs of an AND gate 148. By this construction, a pulse is generated after a change of the received data a4. If the bit timing signal a3 output from the counter unit 23 is at a high level when the pulse from the NOR gate 145 is generated, namely, if the bit timing signal is advanced before the change of the received data, the advance signal a5 is output from the AND gate 146, as shown in FIG. 15. On the contrary, if the bit timing signal a3 is at a low level when the pulse from the NOR gate 145 is generated, namely, if the bit timing signal a3 is delayed with respect to the change of the received signal, the delay signal a6 is output from the AND gate 148.

Figure 17:
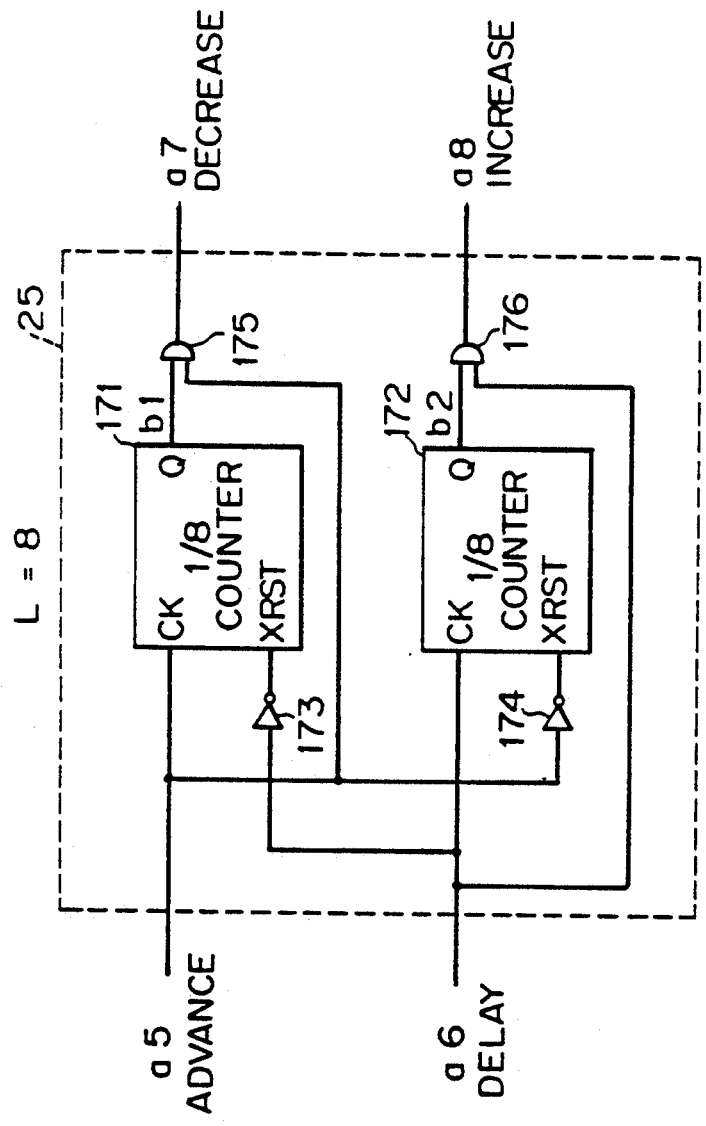
FIG. 17 is a circuit diagram of a stage protection unit 25 in FIG. 11.
Figure 18:
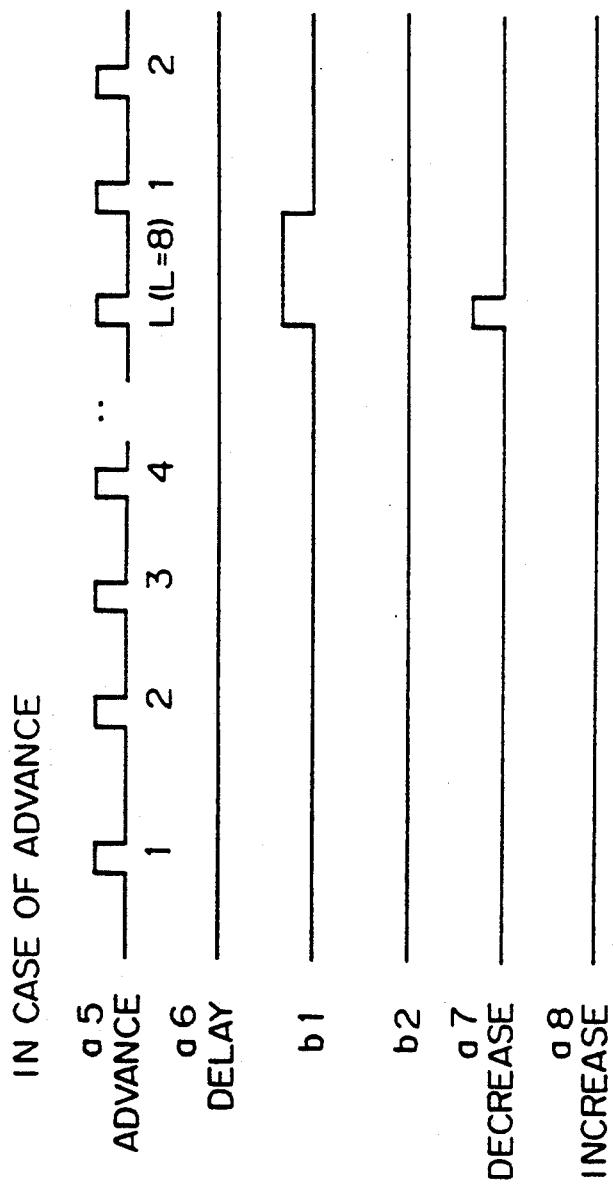
FIG. 18 is an explanatory view of the operation of the unit 25 in the case of an advance.
Figure 19:
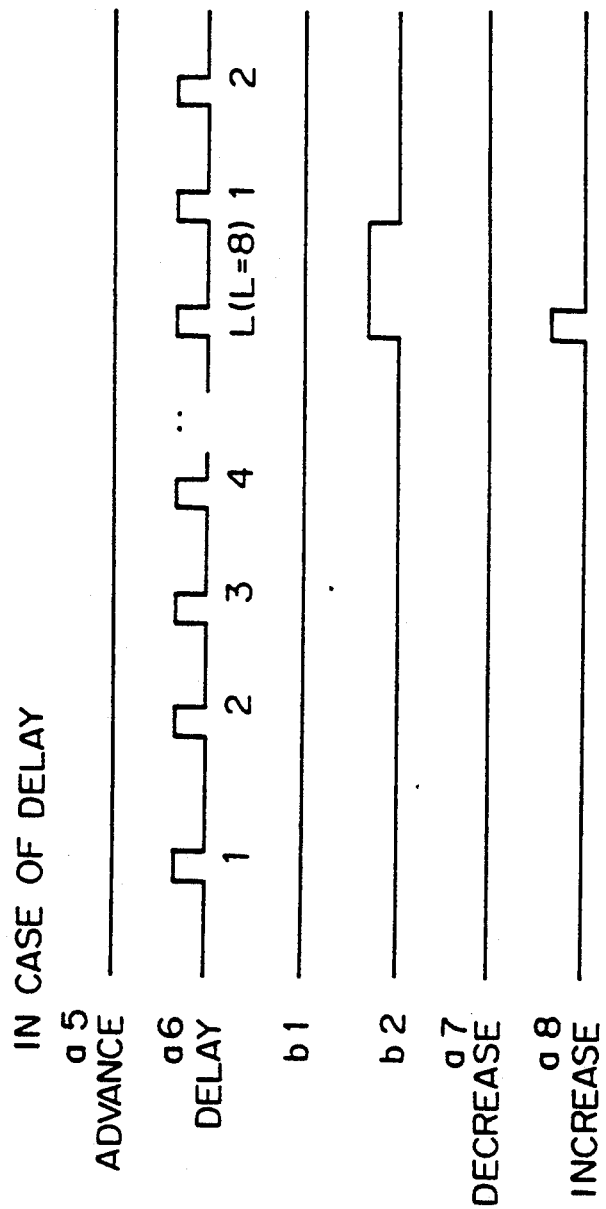
FIG. 19 is an explanatory view of the operation of the unit 25 in the case of a delay.

FIG. 17 is a circuit diagram of the stage protection unit 25, FIG. 18 is an explanatory view of the operation of the stage protection unit 25 in the case of an advance, and FIG. 19 is an explanatory view of the operation of the stage protection unit 25 in the case of a delay. As shown in FIG. 17, the stage protection unit 25 includes two $\frac{1}{8}$ counters 171 and 172, two inverters 173 and 174, and two AND gates 175 and 176. In the case where the bit timing signal a3 is in advance of the received signal a5, namely, when the advance signal a5 is generated, the $\frac{1}{8}$ counter 171 counts the advance pulses a5 L times, for example, 8 times in a row, and then generates an advance protection signal b1. The advance pulse a5 at the generation of the advance protection signal b1 is gated through the AND gate 175. Thus, a decrease signal a7 is obtained at the output of the AND gate 175. In this case, the delay signal a6 is always at the low level which is inverted by the inverter 173 and is applied to the inverted reset terminal XRST of the counter 171.

In the case where the bit timing signal a3 is delayed with respect to the received signal a4, namely when the delay pulse a6 is generated, the $\frac{1}{8}$ counter 172 counts the delay pulses a6 L times, for example, 8 times in a row, and then generates a delay protection signal b2. The delay pulse a6 at the generation of the delay protection signal b2 is gated through the AND gate 176. Thus, an increase signal a8 is obtained at the output of the AND gate 176. In this case, the advance signal a5 is always at the low level which is inverted by the inverter 174 and is applied to the inverted reset terminal XRST of the counter 172.

Figure 20:
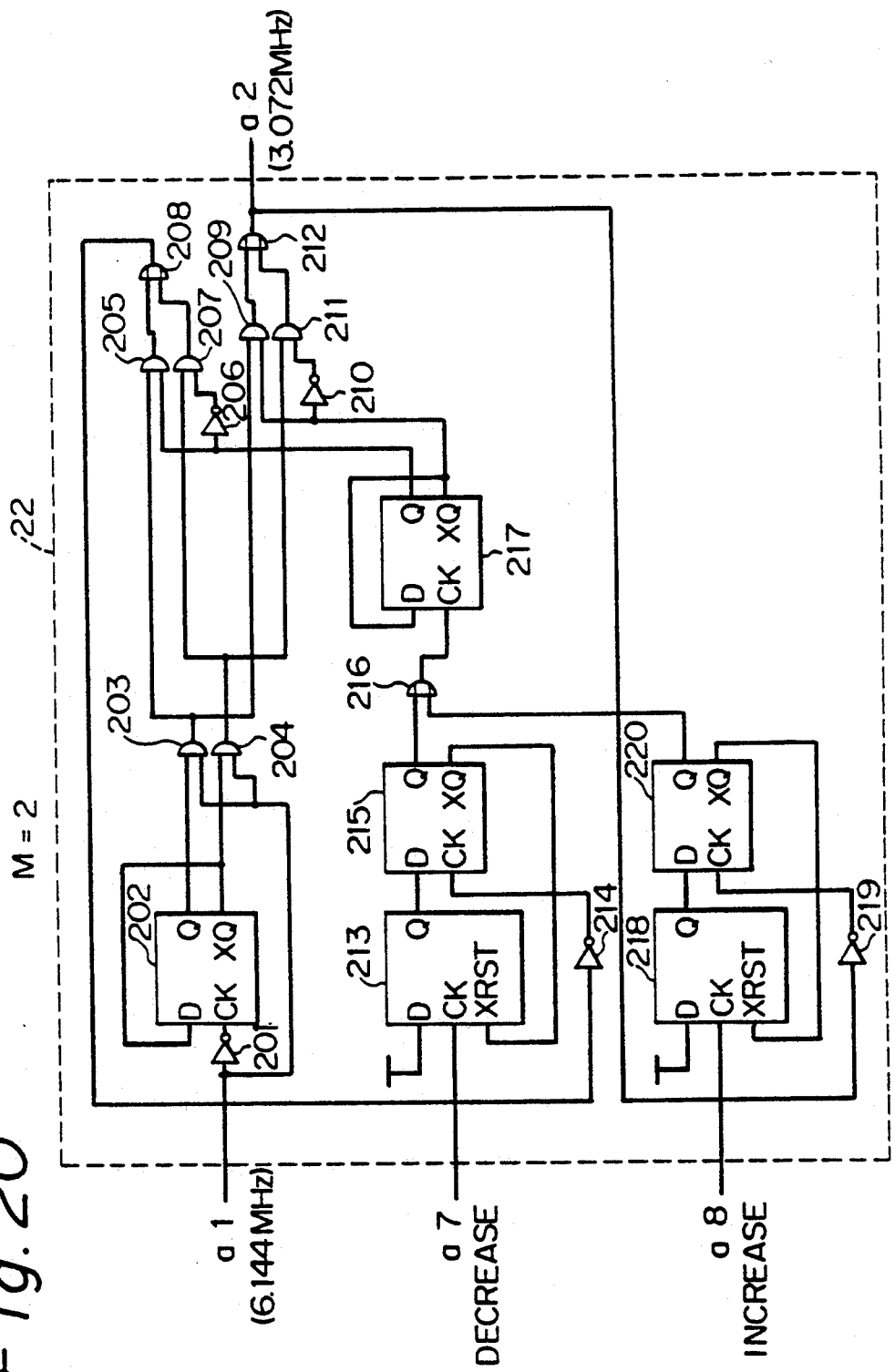
FIG. 20 is a circuit diagram of a pulse adjustment unit 22 in FIG. 11.
Figure 21:
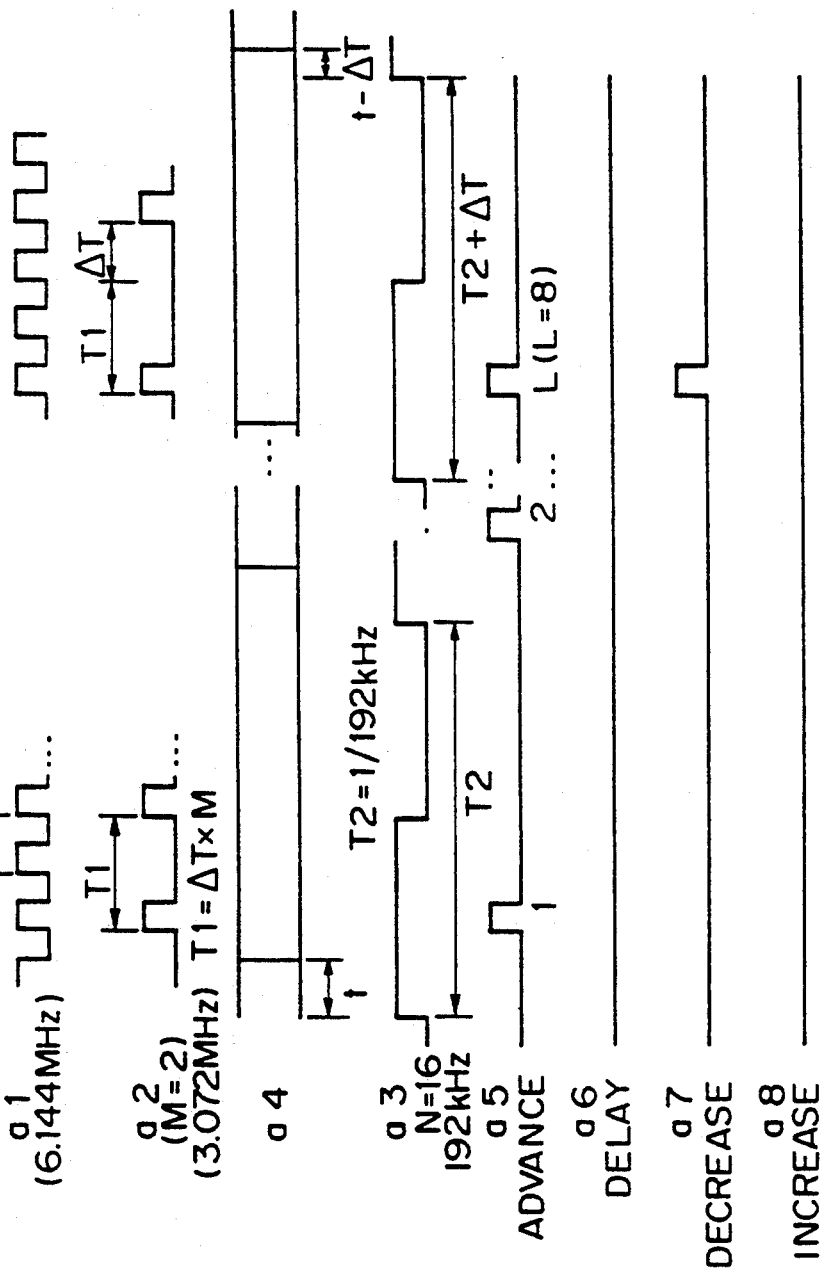
FIG. 21 is an explanatory view of the operation of the unit 22 in the case of an advance.
Figure 23:
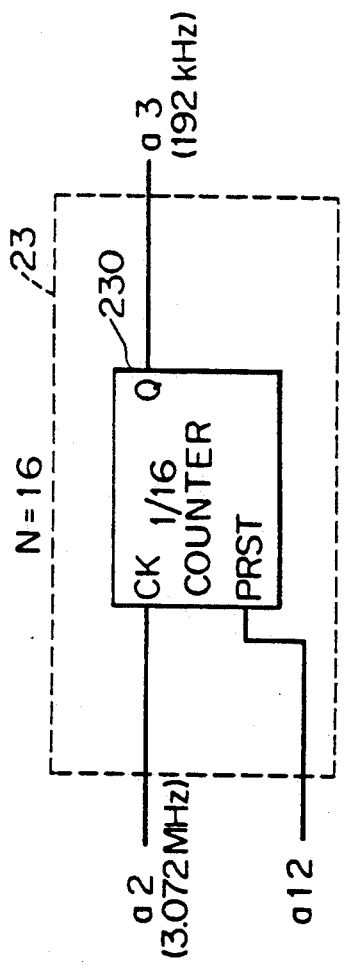
FIG. 23 is a circuit diagram of a counter unit 23 in FIG. 11.

FIG. 20 is a circuit diagram of a pulse adjustment unit 22 in the circuit shown in FIG. 11, FIG. 21 is an explanatory view of the operation of the pulse adjustment unit 22 in the case of an advance, and FIG. 23 is an explanatory view of the operation of the pulse adjustment unit 22 in the case of a delay.

The clock signal a1 from the oscillating unit 21 is applied to an input of an inverter 201, and the output of the inverter 201 is applied to a clock terminal CK of a flipflop 202 which has a D-input connected to an inverted output XQ and has a noninverted output Q. When the output Q of the flipflop 202 is at a high level, the clock signal a1 is passed through an AND gate 203, while when the inverted output XQ is at a high level, the clock signal a1 is passed through an AND gate 204.

The decrease signal a7 from the stage protection unit 25 is applied to a clock terminal of a flipflop 213 which has a D-input pulled up to a power source. The Q output of the flipflop 213 is connected to a D-input of a flipflop 215 which has a clock terminal CK connected through an inverter 214 to the output of an OR gate 208. The inverted output XQ of the flipflop 215 is connected to the inverting reset terminal XRST. The Q output of the flipflop 215 is connected to an input of an OR gate 216. The output of the OR gate 216 is connected to a clock terminal CK of a flipflop 217 which has a D-input connected to its inverted output XQ. The Q output of the flipflop 217 is connected to an input of an AND gate 205 and through an inverter 206 to an input of an AND gate 207. Another input of the AND gate 205 is connected to the output of the AND gate 203. Also, another input of the AND gate 207 is connected to the output of the AND gate 204. The outputs of the AND gates 205 and 207 are connected to the inputs of the OR gate 208.

The inverted output XQ of the flipflop 217 is connected to an input of an AND gate 209 and through an inverter 210 to an input of an AND gate 211. Another input of the AND gate 207 is connected to the output of the AND gate 203. Also, another input of the AND gate 211 is connected to the output of the AND gate 204. The outputs of the AND gates 209 and 211 are connected to the inputs of the OR gate 212.

The increase signal a8 from the stage protection unit 25 is applied to a clock terminal of a flipflop 218 which has a D-input pulled up to a power source. The Q output of the flipflop 218 is connected to a D-input of a flipflop 220 which has a clock terminal CK connected through an inverter 219 to the output of the OR gate 212. The inverted output XQ of the flipflop 220 is connected to the inverting reset terminal XRST of the flipflop 218. The Q output of the flipflop 220 is connected to another input of the OR gate 216.

When neither the decrease signal a7 nor the increase signal a8 is applied to the circuit 22, the clock signal a1 having a period $\Delta T$ is alternately passed through the AND gates 203 and 204. Therefore, every other pulse of the clock signal passes through the AND gates 204 and 211 and the OR gate 212 so that the period T1 of the output signal a2 is $\Delta T \times M$ (M=2).

When the decrease signal a7 is applied to a clock terminal CK of the flipflop 213, namely, when the bit timing signal a3 is in advance of the received signal a4 by a time t as shown in FIG. 21, the clock signal a1 is modified at each time when the decrease signal a7 is supplied to a clock signal a2 which has a period longer than the period T1. Thus, the period of the clock signal a2 in this case is $T1 + \Delta T$. This modification is carried out by the flipflops 213, 215 and 217. Accordingly, the bit timing signal a3 has a period $T2 + \Delta T$. As a result, the difference between the change point of the received signal a3 and the rise time of the bit timing signal a3 is shortened to $\Delta T$.

Figure 22:
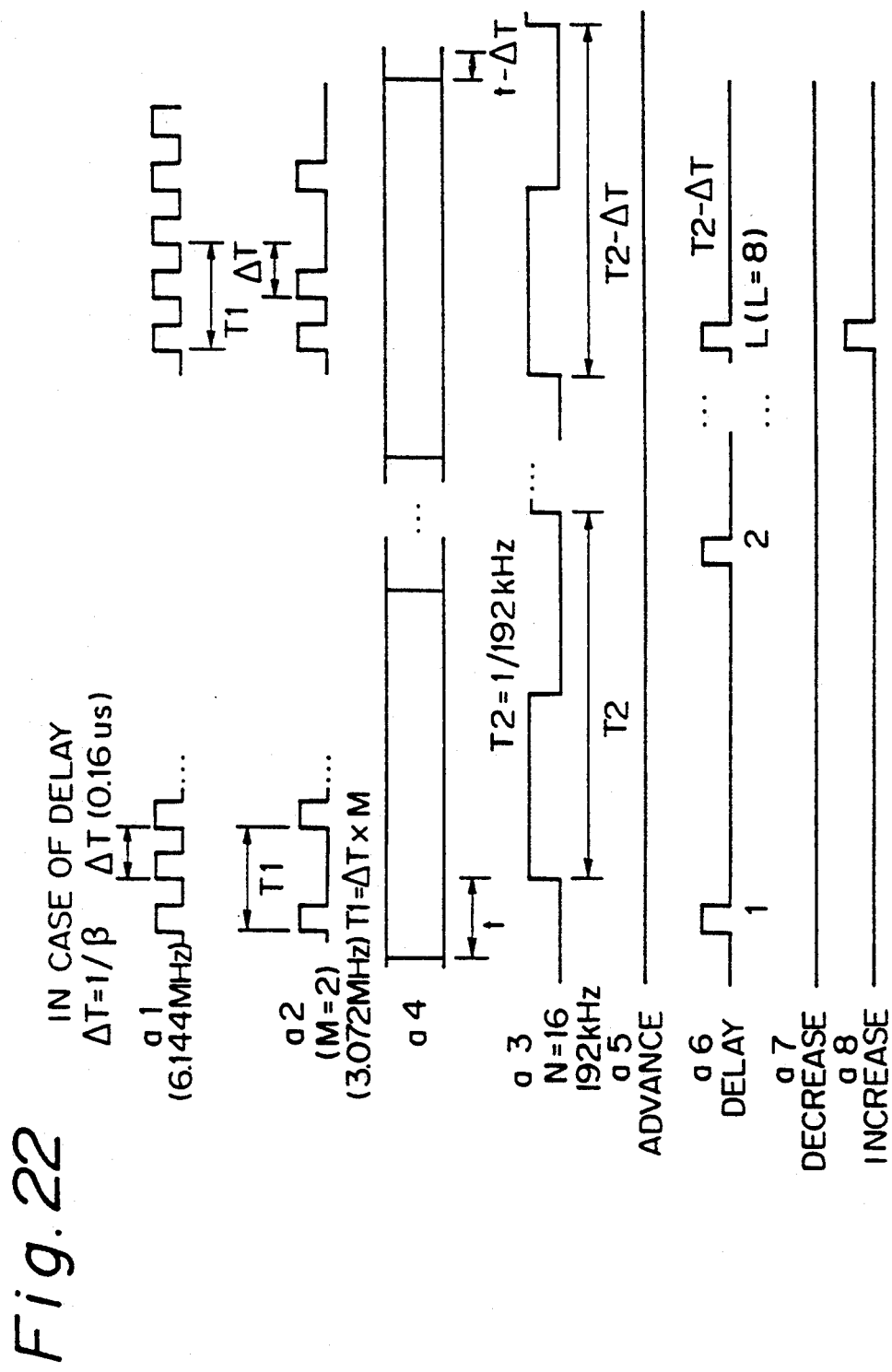
FIG. 22 is an explanatory view of the operation of the unit 22 in the case of a delay.

When the increase signal a8 is applied to a clock terminal CK of the flipflop 218, namely, when the bit timing signal a3 is delayed with respect to the received signal a4 by a time t as shown in FIG. 22, the clock signal a2 is modified to have a shortened period $T1 - \Delta T$ so that the bit timing signal is modified, at each time when the increase signal a8 is applied, to have a shortened period $T2 - \Delta T$, as shown in FIG. 22. This modification is carried out by the flipflops 218, 220, and 217.

FIG. 23 is a circuit diagram of the counter unit 23. As shown in the figure, the counter unit 23 comprises a 1/16 counter 230 having a clock terminal CK, a preset terminal PRST, and a noninverted output Q.

Figure 24:
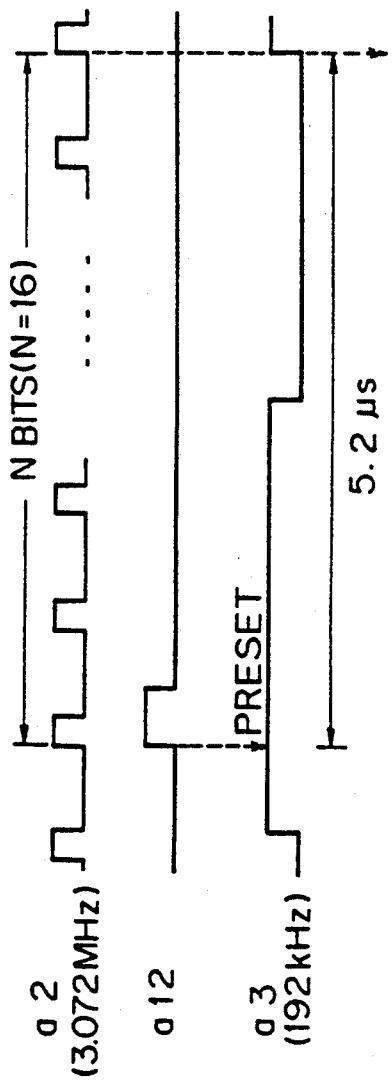
FIG. 24 is an explanatory view of the operation of the unit 23 in FIG. 23.

FIG. 24 is an explanatory view of the operation of the counter unit 23 in FIG. 23. The counter 230 counts the period of 5.2 μs from the preset timing. After the 5.2 μs period, the bit timing signal a3 is raised.

Figure 25A:
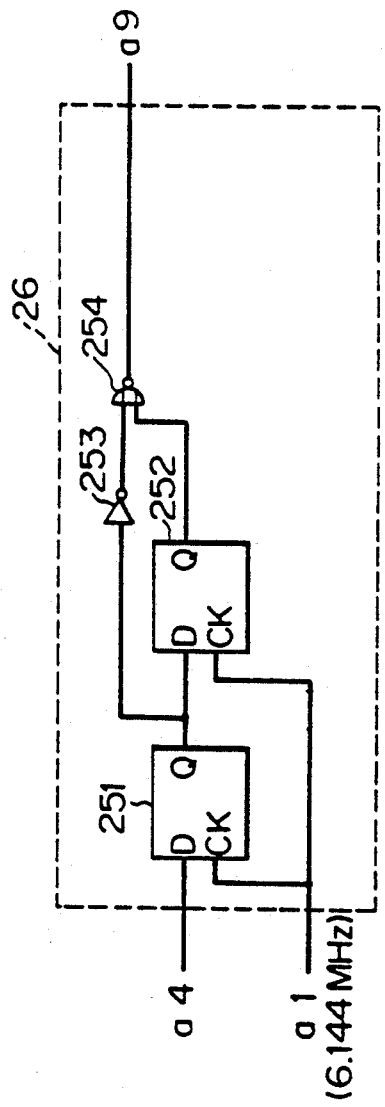
FIG. 25A is a circuit diagram of a change point detecting unit 26 in FIG. 11.
Figure 25B:
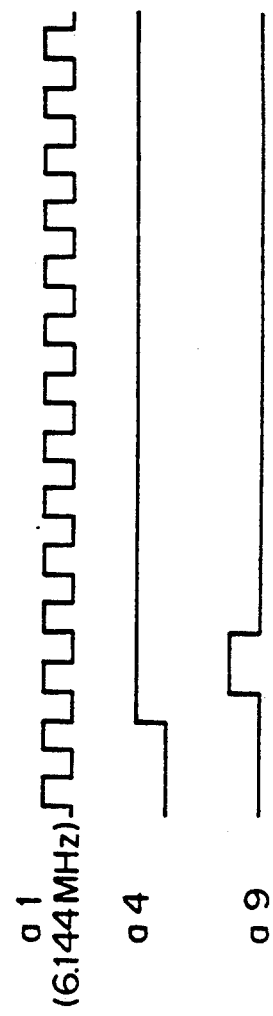
FIG. 25B is an explanatory view of the operation of the unit 26 in FIG. 25A.

FIG. 25A is a circuit diagram of the change point detecting unit 26, and FIG. 25B is an explanatory view of the operation of the change point detecting unit 26. As shown in the figures, after a rise of the received signal a4, a change point detection pulse a9 is generated in response to a rise of the clock signal a1.

Figure 26:
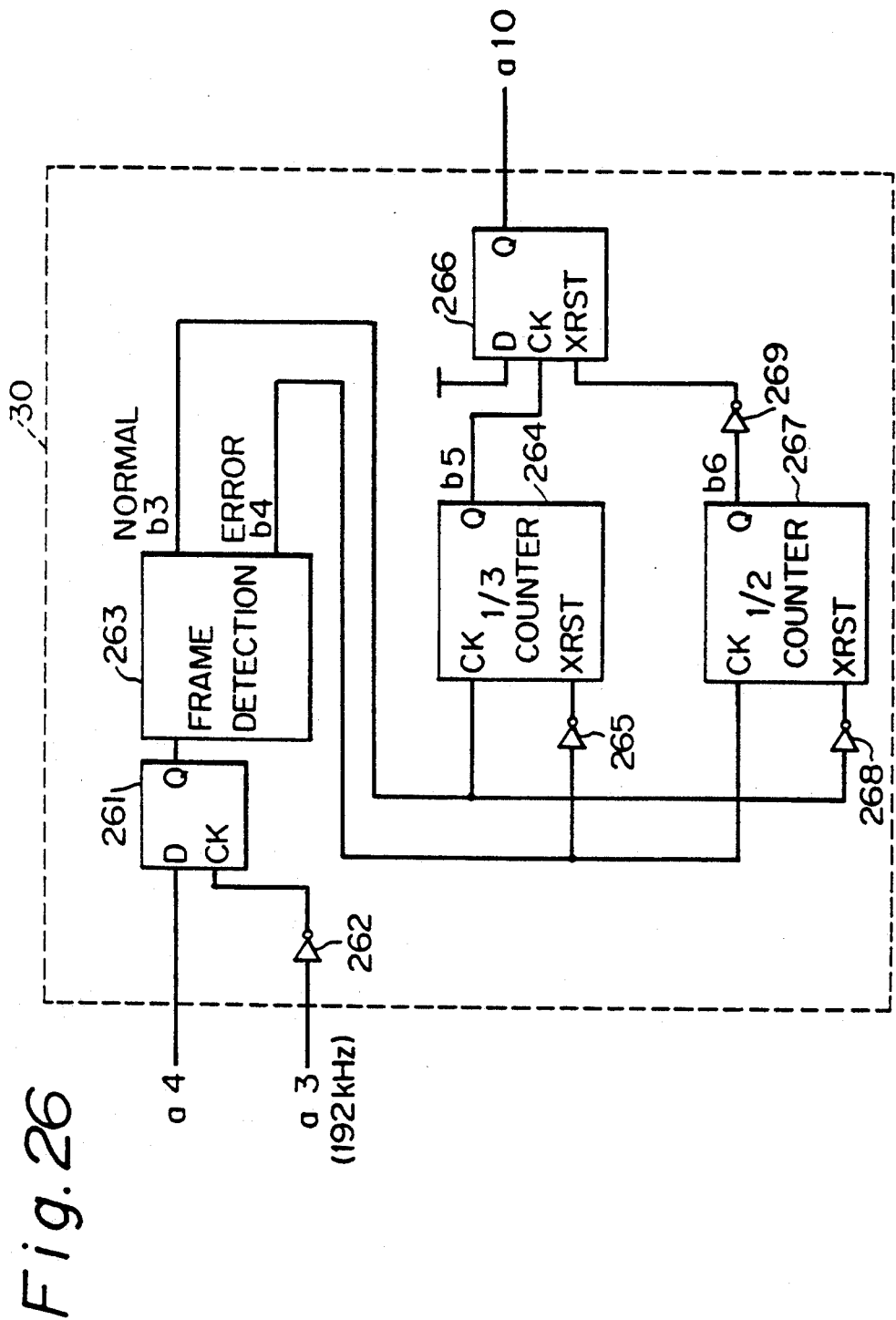
FIG. 26 is a circuit diagram of a frame synchronization detection unit 30 in FIG. 11.
Figure 27:
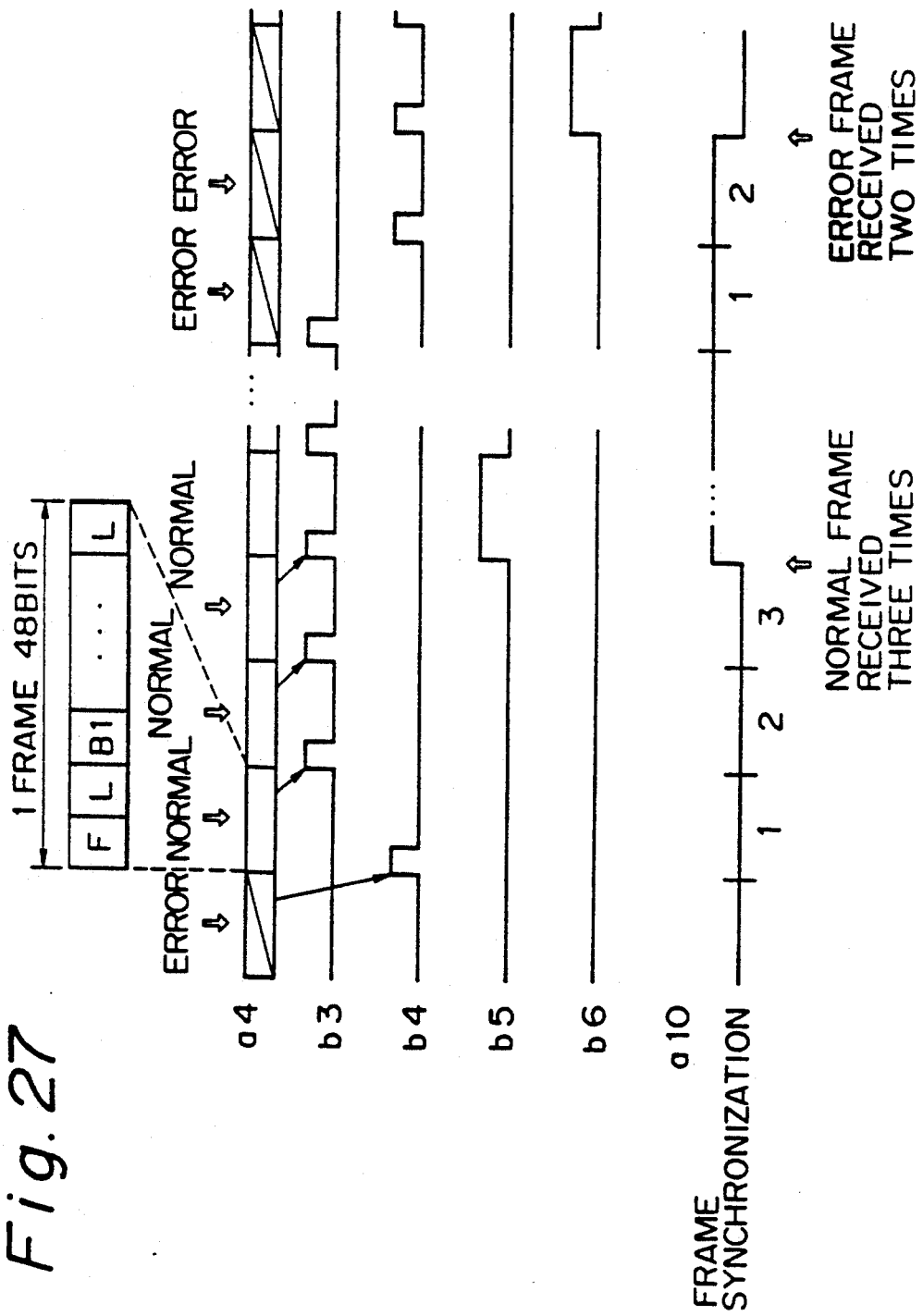
FIG. 27 is an explanatory view of the operation of the unit 30 in FIG. 26.

FIG. 26 is a circuit diagram of the frame synchronization detection unit 30, and FIG. 27 is an explanatory view of the operation of the synchronization detection unit 30 in FIG. 26. As shown in the figures, the frame synchronization detection unit 30 comprises a D-type flipflop 261 having a D-input for receiving the received signal a4. The bit timing signal a3 is applied through an inverter 262 to a clock terminal CK of the flipflop 261. The received data latched by the flipflop 261 is output to a frame detection unit 263. If the received data is normal, a normal indicating signal b3 is output; while if the received data is an error, an error signal b4 is output. The normal signal b3 is applied as a clock signal to a clock terminal CK of a ⅓ counter. The normal signal b3 is also applied through an invertor 268 to an inverted reset terminal XRST of a ½ counter 267. The error signal b4 is applied as a clock signal to a clock terminal CK of the ½ counter 267, and is applied through an inverter 265 to an inverting reset terminal XRST of the ⅓ counter 264. When the ⅓ counter counts the normal signal b3 three times in a row, a pulse b5 is generated form the ⅓ counter 264. The pulse b5 is applied to a clock terminal CK of a flipflop 266 which has a D-input pulled up to a power supply. When the ½ counter counts the error signal b4 two times in a row, a pulse b6 is generated from the ½ counter 267. The pulse b6 is applied through an inverter 269 to an inverting reset terminal XRST of the flipflop 266. By this construction, a frame synchronization signal a10 is output when the normal signal b3 is received three times in a row. The frame synchronization signal a10 continues its high level until the error signal b4 is generated two times in a row.

Figure 28:
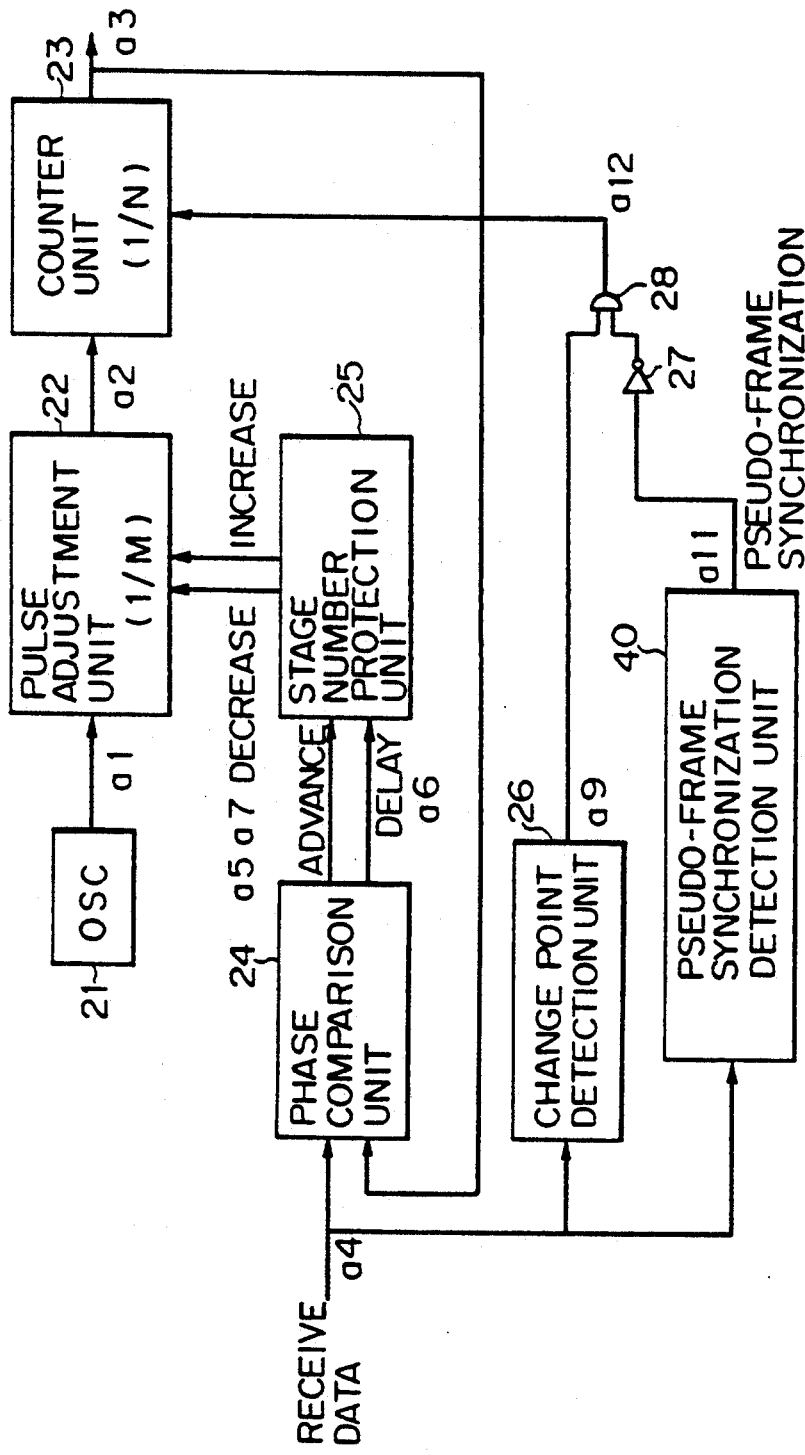
FIG. 28 is a block diagram of a bit synchronization extraction circuit according to another embodiment of the present invention.

FIG. 28 is a block diagram showing the construction of a system of a frame synchronization dependent type bit synchronization detection and extraction circuit according to another embodiment of the present invention.

In FIG. 28, the difference from FIG. 11 is that while, in FIG. 11, use was made of a frame synchronization signal a10 to switch between the counter preset mode and DPLL mode, in FIG. 28, use is made of a pseudo-frame synchronization detection unit 40. The other parts of the construction are the same as in FIG. 11 and the elements are shown by the same reference numerals.

Figure 29:
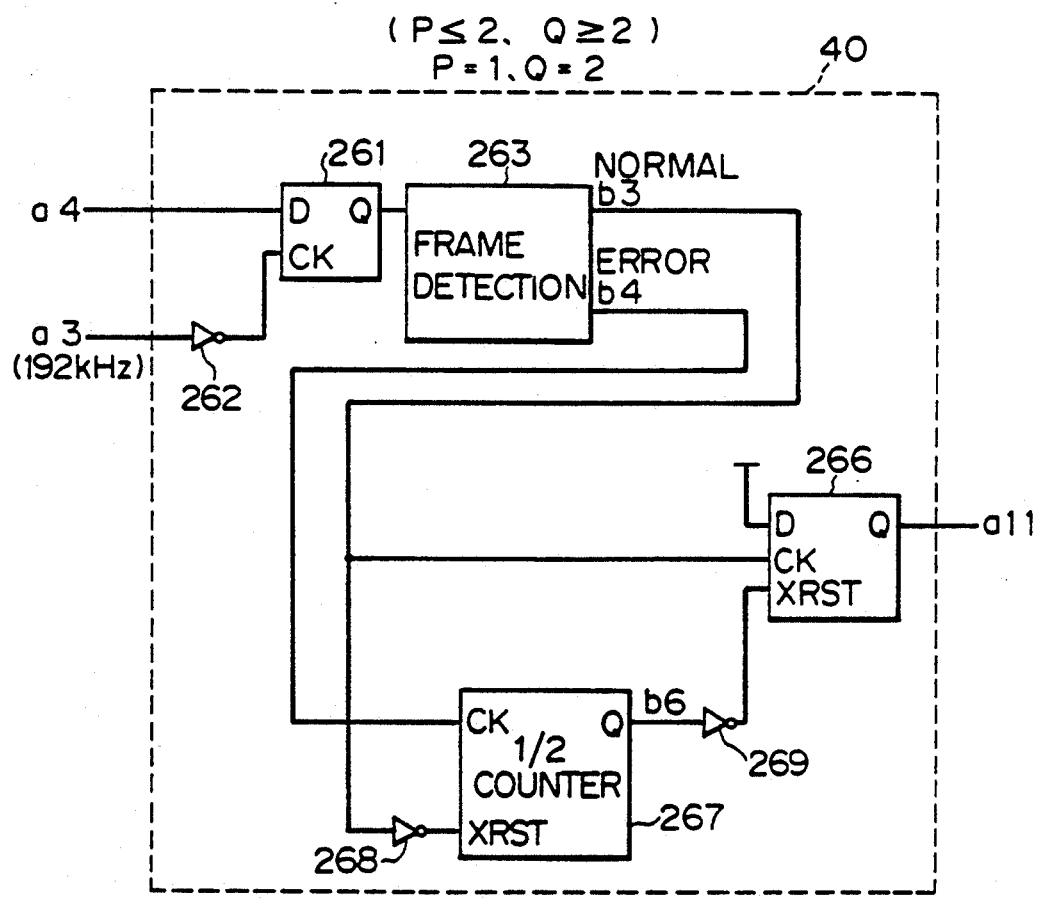
FIG. 29 is a circuit diagram of a pseudo frame synchronization detection unit 40 in FIG. 28.

FIG. 29 is a circuit diagram of a pseudo synchronization detection unit 40 in FIG. 28, and FIG. 30 is an explanatory view of the operation of the unit 40 in FIG. 29. In FIG. 29, the difference from FIG. 26 is that while, in FIG. 26, there is a ⅓ counter 264, in FIG. 30, the ⅓ counter 264 is not provided. The D-type flipflop 266 directly receives at its clock terminal CK the normal signal b3 from the frame detection unit 263. The other parts of the construction are the same as in FIG. 26 and the elements are shown with the same reference numerals.

As can be seen from FIG. 29 and FIG. 30, the pseudo frame synchronization detection unit 40 detects pseudo frames with no more than two as the number P of consecutive frames for establishment of frame synchronization and at least two as the number Q of consecutive error frames for loss of frame synchronization. That is, if one or two normal frames are detected in the received data, pseudo-frame synchronization is detected. When two or more error frames are detected during establishment of a pseudo frame, the pseudo-frame synchronization is off. In this embodiment, P=1 and Q=2. Therefore, the frame synchronization signal a10 in the embodiment of FIG. 11 becomes a high level when three normal frames are received, but the pseudo-frame synchronization signal a11 in the embodiment is immediately generated when one normal frame is received. Even if one normal frame is received, frame synchronization is not deemed established until three in a row have been received, so no disassembly of frames, assembly of frames, or transmission of data can be performed, but when the pseudo-frame synchronization signal a11 becomes high level, there is a shift from the counter preset mode to the DPLL mode. Then if two error frames in a row are received, the counter preset mode is returned to from the DPLL mode. Since there is a quick shift to the DPLL mode, compared with the first embodiment, the time of the DPLL mode is long and therefore stable transmission of data is made.

As clear from the above explanation, according to the present invention, by switching between the counter present mode and the DPLL mode depending on frame synchronization, it is possible to shorten the bit synchronization extraction time and, at establishment of frame synchronization, due to the resistance to line noise and small timing extraction jitter, ensure a bit timing extraction jitter, restriction when transmitting data, of within ±7 percent (0.36 μs).

The present invention is not restricted to the above described embodiments, but various modifications are possible. For example, the present invention may be applied not only to the bit synchronization extraction circuit in an ISDN terminal, but also to other synchronization establishing circuits. Further, even when the frame synchronization detection unit 30 is not provided, the combination itself of the counter preset mode unit and the DPLL mode unit without the frame synchronization detection unit is also effective for quick synchronization establishment. This is because, since the counter 23 is forced to be preset in response to a change in received data, and the output of the counter unit 23 is synchronized with the received data quickly when there is no line noise. Therefore, the synchronization by the DPLL mode is usually realized within a short time.

I claim:

1. A frame synchronization dependent type bit synchronization extraction circuit in an ISDN terminal equipment connected to a reference point S/T of an ISDN basic user network interface, for establishing bit synchronization between an internally produced signal and received data, comprising:

counter preset mode synchronization means for generating a bit timing signal synchronized with said received data by detecting a change point of said received data;

digital phase locked loop made synchronization means for generating the bit timing signal synchronized with said received data by using a digital phased locked loop between said bit timing signal and said received data;

frame synchronization detection means for detecting a frame synchronization of said received data; and inhibiting means, operatively connected to said counter preset mode synchronization means and said frame synchronization detection means, for inhibiting an operation of said counter preset mode synchronization means, after said frame synchroization is detected by said frame synchronization detection means.

2. A frame synchronization dependent type bit synchronization extraction circuit as claimed in claim 1, wherein:

said digital phase locked loop mode synchronization means comprises a PLL circuit having a PLL feedback route, and after said frame synchronization is detected, a feedback route signal on the PLL feedback route is synchronized with said received data by phase comparison.

3. A frame synchronization dependent type bit synchronization extraction circuit as claimed in claim 1, wherein said counter preset mode synchronization means comprises:

oscillating means for generating a free-funning signal;

counter means, operatively connected to said oscillation means, for dividing said free-running signal to produce said internally produced signal; and change point detection means, operatively receiving said received data and operatively connected to said counter means, for detecting a point of change of said received data to generate a change-point signal, wherein said inhibiting means passes said change-point signal to be supplied to said counter means to preset said counter means before said frame synchronization is detected.

4. A frame synchronization dependent type bit synchronization extraction circuit as claimed in claim 1, wherein said digital phase locked loop mode synchronization means comprises:

oscillation means for generating a free-running signal;

counter means, operatively connected to said oscillation means, for dividing said free-running signal to produce said internally produced signal; and phase comparison means, operatively receiving said received data and operatively connected to said counter means, for comparing a phase of said internally produced signal and a phase of said received data to generate a phase difference; and pulse adjustment means, operatively connected between said oscillating means and said counter means and operatively connected to said phase comparison means, for adjusting a number of pulses of said free-funning signal in accordance with the phase difference obtained at an output of said phase comparison means.

5. A frame synchronization dependent type bit synchronization extraction circuit as claimed in claim 1, wherein said counter preset mode synchronization means and said digital phase locked loop mode synchronization means comprises:

oscillation means for generating a free-running signal;

counter means, operatively connected to said oscillation means, for dividing said free-running signal to produce said internally produced signal; and change point detection means, operatively receiving said received data and operatively connected to said counter means, for detecting a point of change of said received data to generate a change-point signal;

phase comparison means, operatively receiving said received data and operatively connected to said counter means, for comparing a phase of said internally produced signal and a phase of said received data to generate a phase difference; and pulse adjustment means, operatively connected between said oscillating means and said counter means and operatively connected to said phase comparison means, for adjusting a number of pulses of said free-funning signal in accordance with the phase difference obtained at an output of said phase comparison means, wherein said inhibiting means passes said change-point signal to be supplied to said counter means to reset said counter means before said frame synchronization is detected.

6. A frame synchronization dependent type bit synchronization extraction circuit as claimed in claim 5, wherein said inhibiting means comprises:

an inverter having an input connected to an output of said frame synchronization detection means; and an AND gate having a first input connected to the output of said change point detection means and having a second input connected to an output of said inverter, an output of said AND gate being connected to a preset terminal of said counter means.

7. A frame synchronization dependent type bit synchronization extraction circuit as claimed in claim 6, wherein said frame synchronization detection means comprises:

normal frame counting means for counting a predetermined number of successive normal frames to generate a frame synchronization signal, and error frame counting means for counting errors in a predetermined number of successive frames to generate a loss of frame synchronization signal, wherein at least one of said frame synchronization signal and said loss of frame synchronization signal is supplied to said input of said inverter.

8. A frame synchronization dependent type bit synchronization extraction circuit as claimed in claim 7, wherein, to generate said frame synchronization signal, said normal frame counting means includes means for counting three successive normal frames.

9. A frame synchronization dependent type bit synchronization extraction circuit as claimed in claim 7, wherein said frame synchronization signal is a pseudo-frame synchronization signal, and wherein, to generate said pseudo-frame synchronization signal, said normal frame counting means includes means for counting no more than two successive normal frames.

10. A frame synchronization dependent type bit synchronization extraction circuit as claimed in claim 5, wherein said phase comparison means comprises:

advance signal generating means for generating an advance signal when said internally produced signal is advanced relative to said received data, and delay signal generating means for generating a delay signal when said internally produced signal is delayed relative to said received data.

11. A frame synchronization dependent type bit synchronization extraction circuit as claimed in claim 10, wherein said pulse adjustment means comprises:
a pulse adjustment unit, operatively connected between said oscillation means and said counter means, for adjusting a number of pulses occurring in said free-running signal, and
a stage number protection unit, operatively connected between said phase comparison means and said pulse adjustment unit, for generating a decrease signal, for supplying said decrease signal to said pulse adjustment unit when said advance signal is generated a first predetermined number of times in succession, for generating an increase signal and for supplying said increase signal to said pulse adjustment unit when said delay signal is generated a second predetermined number of times in succession.

12. A frame synchronization dependent type bit synchronization extraction circuit as claimed in claim 5, wherein said counter means comprises a 1/N dividing counter for counting N bits, where N is a positive integer, after said change-point signal is applied from said change point detection means through said inhibiting means to said counter means.

13. A frame synchronization dependent type bit synchronization extraction circuit is an ISDN terminal equipment connected to a reference point S/T of an ISDN basic user network interface, for establishing bit synchronization between and internally produced signal and received data, comprising:
oscillation means for generating a free-running signal;
counter means for dividing said free-running signal to produce said internally produce signal of a predetermined frequency;
phase comparison means for comparing a phase of said internally produced signal output from said counter means and a phase of said received data to generate a phase difference;
pulse adjustment means for adjusting a number of pulses of said free-funning signal in accordance with the phase difference obtained at an output of said phase comparison means;
change point detection means for detecting a point of change of said received data;
frame synchronization detection means for detecting a frame synchronization from the received data; and
switching means for forcing said counter means to be preset at the point of change of said received data by said change point detection means to establish the bit synchronization before said frame synchronization detection means detects frame synchronization, and for forcing the number of pulses of said free-running signal to be changed in accordance with the phase difference obtained at the output of said phase comparison means after said frame synchronization detection means detects frame synchronization.

14. A frame synchronization dependent type bit synchronization extraction circuit as claimed in claim 13, wherein said switching means comprises:
an inverter having an input connected to an output of said frame synchronization detection means; and
an AND gate having a first input connected to the output of said change point detection means and having a second input connected to the output of said inverter, an output of said AND gate being connected to a preset terminal of said counter means.

15. A frame synchronization dependent type bit synchronization extraction circuit as claimed in claim 14, wherein said frame synchronization detection means comprises:
normal frame counting means for counting a predetermined number of successive normal frames to generate a frame synchronization signal, and
error frame counting means for counting errors in a predetermined number of successive frame to generate a loss of frame synchronization signal,
wherein at least one of said frame synchronization signal and said loss of frame synchronization signal is supplied to said input of said inverter.

16. A frame synchronization dependent type bit synchronization extraction circuit as claimed in claim 15, wherein, to generate said frame synchronization signal, said normal frame counting means includes means for counting three successive normal frames.

17. A frame synchronization dependent type bit synchronization extraction circuit as claimed in claim 15,
wherein said frame synchronization signal is a pseudo-frame synchronization signal, and
wherein, to generate said pseudo-frame synchronization signal, said normal frame counting means includes means for counting no more than two successive frames.

18. A frame synchronization dependent type bit synchronization extraction circuit as claimed in claim 13, wherein said phase comparison means comprises:
advance signal generating means for generating an advance signal when said internally produced signal is advanced relative to said received data, and
delay signal generating means for generating a delay signal when said internally produced signal is delayed relative to said received data.

19. A frame synchronization dependent type bit synchronization extraction circuit as claimed in claim 18, wherein said pulse adjustment means comprises:
a pulse adjustment unit, operatively connected between said oscillation means and said counter means, for adjusting a number of pulses occurring in said free-running signal, and
a stage number protection unit, operatively connected between said phase comparison means and said pulse adjustment unit, for generating a decrease signal, for supplying said decrease signal to said pulse adjustment unit when said advance signal is generated a first predetermined number of times in succession, for generating an increase signal and for supplying said increase signal to said pulse adjustment unit when said delay signal is generated a predetermined number of times in succession.

20. A frame synchronization dependent type bit synchronization extraction circuit as claimed in claim 13, wherein said counter means comprises a 1/N dividing counter for counting N bits, where N is a positive integer, after said change-point signal is applied from said change point detection means through said switching means to said counter means.

21. A frame synchronization dependent type bit synchronization extraction circuit as claimed in claim 13, wherein said frame synchronization detection means detects an establishment of frame synchronization for said received data when three successive normal frames are detected by said frame synchronization detection means.

22. A frame synchronization dependent type bit synchronization extraction circuit as claimed in claim 13,
wherein said frame synchronization detection means is a pseudo-frame synchronization detections means, and
wherein said pseudo-frame synchronization detection means detects an establishment of frame synchronization for said received data when no more than two successive normal frames are detected by said pseudo-frame synchronization detection means.

23. A frame synchronization dependent type bit synchronization extraction circuit as claimed in claim 13, wherein said frame synchronization detection means detects a loss of frame synchronization for said received data when two successive error frames are detected by said frame synchronization detection means.

24. A frame synchronization dependent type bit synchronization extraction circuit as claimed in claim 13,
wherein said frame synchronization detection means is a pseudo-frame synchronization detection means, and
wherein said pseudo-frame synchronization detection means detects a loss of frame synchronization for said received data when at least two successive error frames are detected by said pseudo-frame synchronization detection means.

* * * * *